United States Patent
Baek

(10) Patent No.: US 10,282,019 B2
(45) Date of Patent: May 7, 2019

(54) ELECTRONIC DEVICE AND METHOD FOR PROCESSING GESTURE INPUT

(71) Applicant: Samsung Electronics Co., Ltd., Gyeonggi-do (KR)

(72) Inventor: In-Ho Baek, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/492,296

(22) Filed: Apr. 20, 2017

(65) Prior Publication Data
US 2017/0308225 A1   Oct. 26, 2017

(30) Foreign Application Priority Data

Apr. 20, 2016 (KR) .................. 10-2016-0048236

(51) Int. Cl.
*G06F 3/041* (2006.01)
*G06F 3/0488* (2013.01)

(52) U.S. Cl.
CPC .......... *G06F 3/0416* (2013.01); *G06F 3/0488* (2013.01)

(58) Field of Classification Search
CPC .............. G06F 3/0416; G06F 3/0488
See application file for complete search history.

(56) References Cited

U.S. PATENT DOCUMENTS

| | | | |
|---|---|---|---|
| 2013/0019205 A1* | 1/2013 | Gil ................. | G06F 3/04812 715/834 |
| 2013/0053007 A1 | 2/2013 | Cosman et al. | |
| 2013/0080964 A1* | 3/2013 | Shigeta .............. | G06F 3/0488 715/773 |
| 2014/0006983 A1* | 1/2014 | Goodman ........... | G06F 3/0483 715/764 |
| 2014/0309871 A1* | 10/2014 | Ricci ................. | B60Q 1/00 701/36 |
| 2014/0320434 A1* | 10/2014 | Pantel ................ | G06F 3/017 345/173 |
| 2016/0239202 A1* | 8/2016 | Lee .................. | G06F 3/04883 |

FOREIGN PATENT DOCUMENTS

| KR | 10-2014-0051968 A | 5/2014 |
|---|---|---|
| KR | 10-2016-0101605 A | 8/2016 |

* cited by examiner

*Primary Examiner* — Andrew Sasinowski
(74) *Attorney, Agent, or Firm* — Cha & Reiter, LLC

(57) ABSTRACT

According to the present disclosure, there are provided an electronic device and method for processing gesture inputs. According to an embodiment of the present disclosure, an electronic device may include a touch sensitive display, a processor, and a memory including instructions executable by the processor to detect a first gesture input to the touch sensitive display while an object is displayed on the same, in response to the first gesture input, detected a first function corresponding to the object from among a plurality of functions, and in response to detecting a second gesture input to the touch sensitive display, control the detected first function according to the second gesture input. Other embodiments are also possible.

20 Claims, 29 Drawing Sheets

ELECTRONIC DEVICE AND METHOD FOR PROCESSING GESTURE INPUT

CLAIM OF PRIORITY

This application claims the benefit under 35 U.S.C. § 119(a) of a Korean patent application filed in the Korean Intellectual Property Office on Apr. 20, 2016 and assigned Ser. No. 10-2016-0048236, the entire disclosure of which is incorporated herein by reference.

TECHNICAL FIELD

Various embodiments of the present disclosure relate to electronic devices and methods for processing gesture inputs.

BACKGROUND

Smartphones and other various electronic devices have advanced in performance, and are now equipped with many input/output devices for delivering a diversity of information to their users. For example, an electronic device may receive touch, hover, or gesture inputs from a user through a display (e.g., a touch panel-equipped touch sensitive display) and display various information to the user. A touchscreen or other similar devices capable of directly or indirectly receiving user's inputs through a display for showing information from an electronic device are used as an input device of the electronic device. Thus, the user may perform various interactions with the electronic device; e.g., transmitting the information to another electronic device, turning on/off the display of the electronic device, increasing/decreasing the sound volume of the electronic device, adjusting the brightness of the display, or controlling the function of an application by directly touching the surface of the display, hovering (e.g., sensing a position on the surface of the display in a contactless state), or conducting various types of gesture recognition to thereby control various types of information displayed on the display.

As the electronic device performs various interactions by processing complicated gesture inputs, the user may have difficulty in recognizing such gesture inputs. A recent demand exists for a method for an electronic device to perform various gesture-based interactions in a more simplified way.

SUMMARY

According to embodiments of the present disclosure, there may be provided an electronic device and method for processing gesture inputs to perform various interactions as per the gesture inputs.

According to embodiments of the present disclosure, there may be provided an electronic device and method for processing gesture inputs.

According to an embodiment of the present disclosure, an electronic device may include a touch sensitive display, a processor, and a memory including instructions executable by the processor to detect a first gesture input to the touch sensitive display while an object is displayed on the same, in response to the first gesture input, detected a first function corresponding to the object from among a plurality of functions, and in response to detecting a second gesture input to the touch sensitive display, control the detected first function according to the second gesture input.

According to an embodiment of the present disclosure, a method is disclosed including detecting a first gesture input to a touch sensitive display while an object is displayed on the same, in response to the first gesture input, detecting a first function corresponding to the object from among a plurality of functions, and in response to detecting a second gesture input to the touch sensitive display, controlling the detected first function according to the second gesture.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

Throughout the drawings, like reference numerals will be understood to refer to like parts, components, and structures.

DETAILED DESCRIPTION

Figure 1:
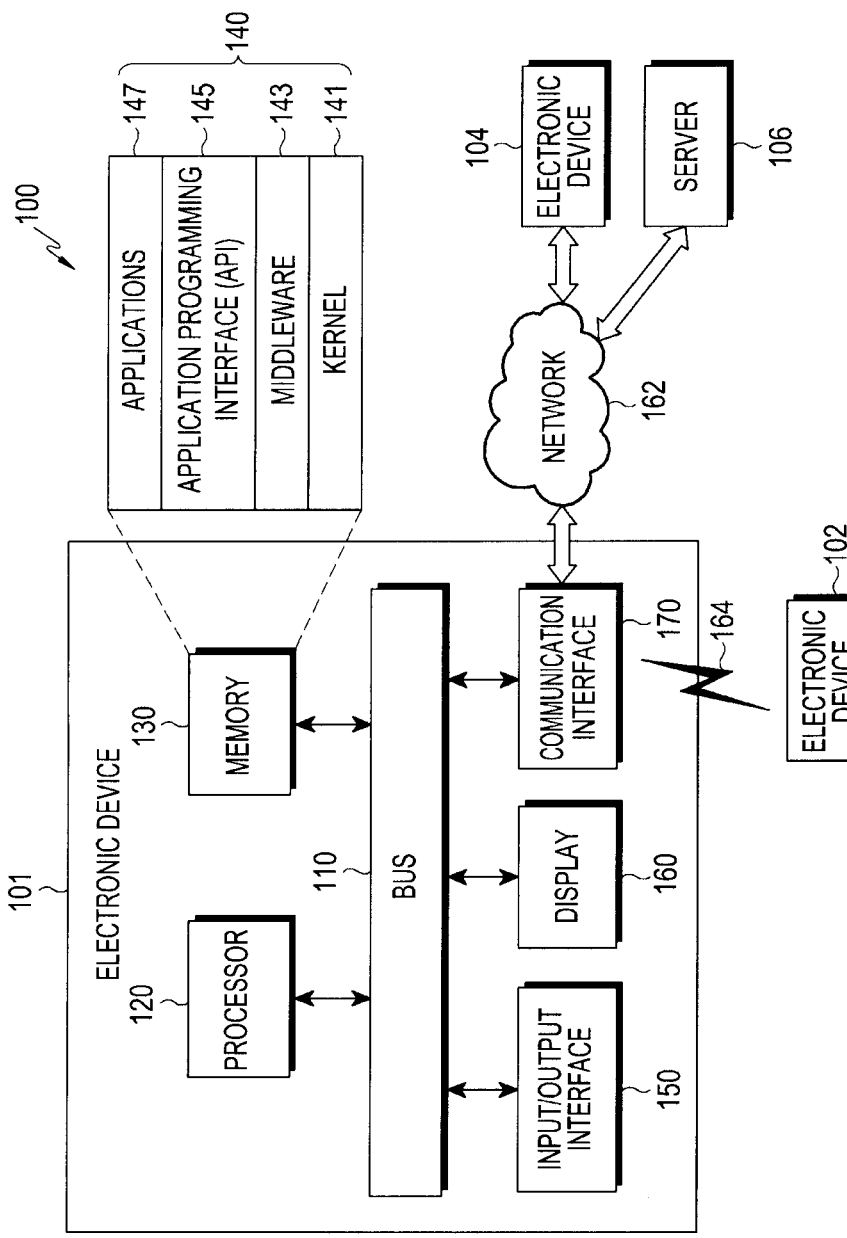
FIG. 1 illustrates a network environment including an electronic device according to an embodiment of the present disclosure.

Hereinafter, embodiments of the present disclosure are described with reference to the accompanying drawings. However, it should be appreciated that the present disclosure is not limited to the embodiments and the terminology used herein, and all changes and/or equivalents or replacements thereto also belong to the scope of the present disclosure. The same or similar reference denotations may be used to refer to the same or similar elements throughout the specification and the drawings. It is to be understood that the singular forms "a," "an," and "the" include plural references unless the context clearly dictates otherwise. As used herein, the terms "A or B," "at least one of A and/or B," or "A/B" may include all possible combinations of A and B. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the terms "configured to" may be interchangeably used with other terms, such as "suitable for," "capable of," "modified to," "made to," "adapted to," "able to," or "designed to" in hardware or software in the context. Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. In some embodiments, examples of the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present disclosure, the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, a sprinkler, a fire alarm, a thermostat, a street light, a toaster, fitness equipment, a hot water tank, a heater, or a boiler). According to various embodiments of the disclosure, examples of the electronic device may at least one of part of a piece of furniture, building/structure or vehicle, an electronic board, an electronic signature receiving device, a projector, or various measurement devices (e.g., devices for measuring water, electricity, gas, or electromagnetic waves). According to embodiments of the present disclosure, the electronic device may be flexible or may be a combination of the above-enumerated electronic devices. According to an embodiment of the present disclosure, the electronic device is not limited to the above-listed embodiments. As used herein, the term "user" may denote a human or another device (e.g., an artificial intelligent electronic device) using the electronic device.

Referring to FIG. 1, according to an embodiment of the present disclosure, an electronic device 101 is included in a network environment 100. The electronic device 101 may include a bus 110, a processor 120, a memory 130, an input/output interface 150, a display 160, and a communication interface 170. In some embodiments, the electronic device 101 may exclude at least one of the components or may add another component.

The bus 110 may include a circuit for connecting the components 110 to 170 with one another and transferring communications (e.g., control messages or data) between the components.

The processor or processing module 120 may include one or more of a central processing unit (CPU), an application processor (AP), or a communication processor (CP). The processor 120 may perform control on at least one of the other components of the electronic device 101, and/or perform an operation or data processing relating to communication.

According to an embodiment of the present disclosure, the processor 120 may detect (e.g., determine or identify) a first gesture (e.g., at least one of a single-finger touch and drag, two-finger touch and drag, and three-finger touch and drag) inputted onto a touch sensitive display included in the display 160 while an object (e.g., a sound volume setting screen, display brightness setting screen, time setting screen, application icon, or application running screen) is displayed on the touch sensitive display and control a first function (e.g., a display brightness adjusting function, text reading function, personal information protecting function, or sound volume adjusting function) corresponding to the first gesture and the object as per a second gesture (e.g., a touch, drag, swipe, or a combination of at least two or more thereof) inputted onto the touch sensitive display. When the first gesture is inputted, the processor 120 may determine (e.g., detect or identify) an attribute (e.g., a sound volume setting, display brightness setting, or time setting) of the object among a plurality of functions and invoke the first function (e.g., a sound volume setting function, display brightness setting function, or time setting function) related to the determined attribute. For example, where the object is an application, the processor 120 may determine the attribute or state (e.g., call, search, time, or memo) of a running application (e.g., an application that is currently running and whose running screen is displayed) and invoke the first function (e.g., a call-related function, search-related function, time setting-related function, or text input-related function) related to the determined attribute or state.

The memory 130 may include a volatile and/or non-volatile memory. For example, the memory 130 may store commands or data related to at least one other component of the electronic device 101.

According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS).

For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example. Further, the middleware 143 may process one or more task requests received from the application program 147 in order of priority. For example, the middleware 143 may assign a priority of using system resources (e.g., bus 110, processor 120, or memory 130) of the electronic device 101 to at least one of the application programs 147 and process one or more task requests. The API 145 is an interface allowing the application 147 to control functions provided from the kernel 141 or the middleware 143. For example, the API 133 may include at least one interface or function (e.g., a command) for filing control, window control, image processing or text control. For example, the input/output interface 150 may transfer commands or data input from the user or other external device to other component(s) of the electronic device 101 or may output commands or data received from other component(s) of the electronic device 101 to the user or other external devices.

The display 160 may include, e.g., a liquid crystal display (LCD), a light emitting diode (LED) display, an organic light emitting diode (OLED) display, a microelectromechanical systems (MEMS) display, or an electronic paper display. The display 160 may display, e.g., various contents (e.g., text, images, videos, icons, or symbols) to the user. The display 160 may include a touch sensitive display and may receive, e.g., a touch, gesture, proximity, drag, swipe, or hovering input using an electronic pen or a body portion of the user.

For example, the communication interface 170 may set up communication 164 between the electronic device 101 and an external device (e.g., a first electronic device 102, a second electronic device 104, or a server 106). For example, the communication interface 170 may be connected with a network 162 through wireless communication or wired communication and may communicate with an external device (e.g., the second external electronic device 104 or server 106).

The wireless communication may include cellular communication which uses at least one of, e.g., long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM). According to an embodiment of the present disclosure, the wireless communication may include at least one of, e.g., wireless fidelity (Wi-Fi), bluetooth, bluetooth low power (BLE), zigbee, near field communication (NFC), magnetic secure transmission (MST), radio frequency, or body area network (BAN). According to an embodiment of the present disclosure, the wireless communication may include global navigation satellite system (GNSS). The GNSS may be, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, power line communication (PLC), or plain old telephone service (POTS). The network 162 may include at least one of telecommunication networks, e.g., a computer network (e.g., local area network (LAN) or wide area network (WAN)), Internet, or a telephone network.

The first and second external electronic devices 102 and 104 each may be a device of the same or a different type from the electronic device 101.

According to an embodiment of the present disclosure, all or some of operations executed on the electronic device 101 may be executed on another or multiple other electronic devices (e.g., the electronic devices 102 and 104 or server 106).

According to an embodiment of the present disclosure, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Figure 2:
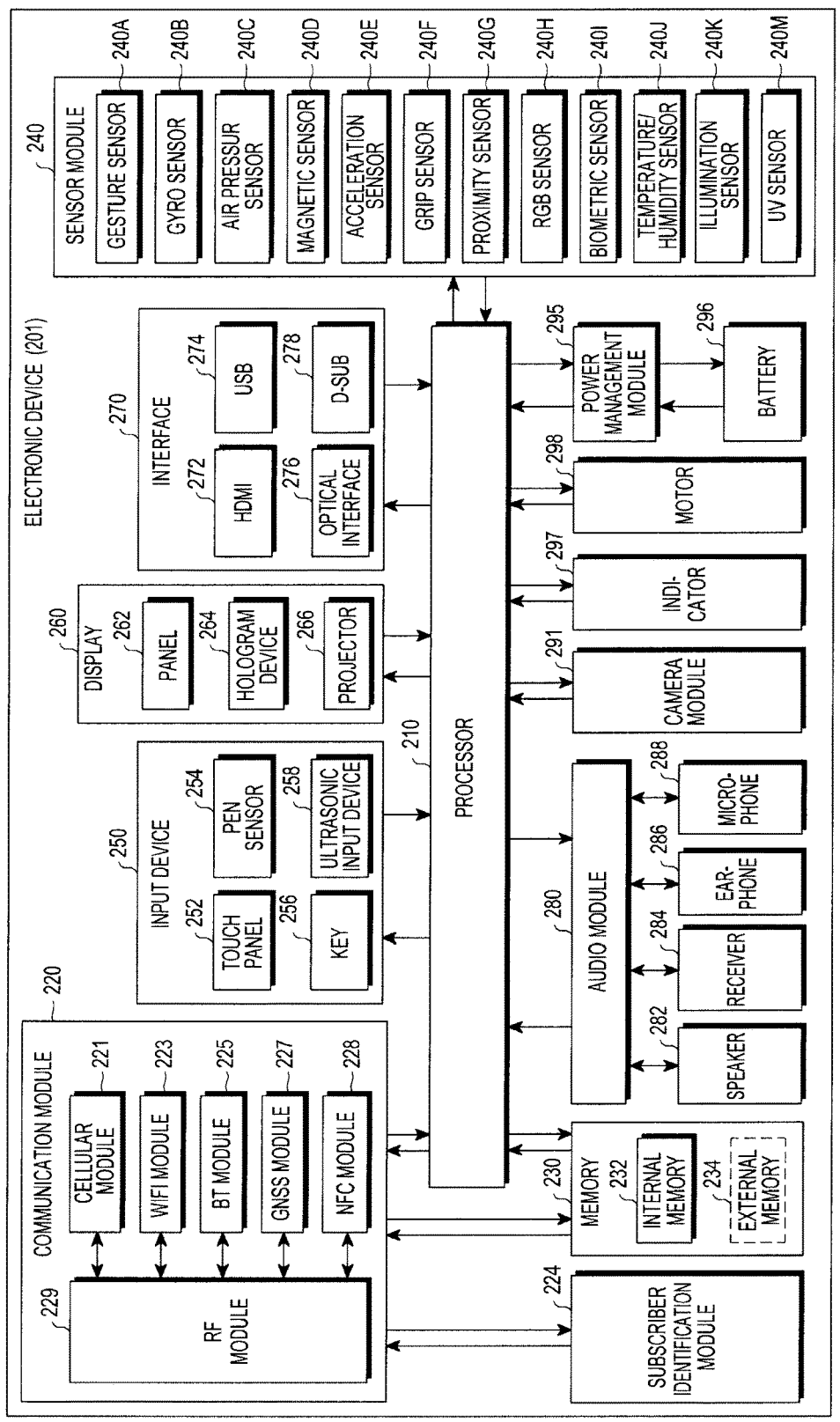
FIG. 2 is a block diagram illustrating an electronic device according to an embodiment of the present disclosure.

FIG. 2 is a block diagram illustrating an electronic device 201 according to an embodiment of the present disclosure.

The electronic device 201 may include the whole or part of the configuration of, e.g., the electronic device 101 shown in FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 may control multiple hardware and software components connected to the processor 210 by running, e.g., an operating system or application programs, and the processor 210 may process and compute various data. The processor 210 may be implemented in, e.g., a system on chip (SoC).

According to an embodiment of the present disclosure, the processor 210 may further include a graphic processing unit (GPU) and/or an image signal processor. The processor 210 may include at least some (e.g., the cellular module 221) of the components shown in FIG. 2. The processor 210 may load a command or data received from at least one of other components (e.g., a non-volatile memory) on a volatile memory, process the command or data, and store resultant data in the non-volatile memory.

According to an embodiment of the present disclosure, the processor 210 may display at least one object (e.g., a sound volume setting screen, display brightness setting screen, time setting screen, application icon, or application running screen) on the display 260 and select (or focus) at least part of the object as per selection. The processor 210, when a first gesture (e.g., a touch, drag, swipe, or a combination of at least two or more thereof) through the touch panel 252, may detect a first function corresponding to at least one object among a plurality of preset functions corresponding to the first gesture and display a menu for notifying of the determined first function on the display 260. When a second gesture for controlling the first function is inputted through the touch panel 252, the processor 210 may adjust a set value (or attribute value) of the first function as per the second gesture (e.g., a touch, drag, swipe, or a combination of at least two or more thereof) and control the first function corresponding to the adjusted set value. The first gesture and the second gesture may be the same or different from each other.

The communication module 220 may have the same or similar configuration to the communication interface 170. The communication module 220 may include, e.g., a cellular module 221, a wireless fidelity (Wi-Fi) module 223, a bluetooth (BT) module 225, a GNSS module 227, a NFC module 228, and a RF module 229. The cellular module 221 may provide voice call, video call, text, or Internet services through, e.g., a communication network. The cellular module 221 may perform identification or authentication on the electronic device 201 in the communication network using a subscriber identification module 224 (e.g., the SIM card). According to an embodiment of the present disclosure, the cellular module 221 may perform at least some of the functions providable by the processor 210. According to an embodiment of the present disclosure, the cellular module 221 may include a communication processor (CP). According to an embodiment of the present disclosure, at least some (e.g., two or more) of the cellular module 221, the Wi-Fi module 223, the Bluetooth module 225, the GNSS module 227, or the NFC module 228 may be included in a single integrated circuit (IC) or an IC package. The RF module 229 may communicate data, e.g., communication signals (e.g., RF signals). The RF module 229 may include, e.g., a transceiver, a power amp module (PAM), a frequency filter, a low noise amplifier (LNA), or at least one antenna. According to an embodiment of the present disclosure, at least one of the cellular module 221, the Wi-Fi module 223, the bluetooth module 225, the GNSS module 227, or the NFC module 228 may communicate RF signals through a separate RF module. The subscription identification module 224 may include, e.g., a card including a subscriber identification module, or an embedded SIM, and may contain unique identification information (e.g., an integrated circuit card identifier (ICCID) or subscriber information (e.g., an international mobile subscriber identity (IMSI)).

The memory 230 (e.g., the memory 130) may include, e.g., an internal memory 232 or an external memory 234. The internal memory 232 may include at least one of, e.g., a volatile memory (e.g., a dynamic RAM (DRAM), a static RAM (SRAM), a synchronous dynamic RAM (SDRAM), etc.) or a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD). The external memory 234 may include a flash drive, e.g., a compact flash (CF) memory, a secure digital (SD) memory, a micro-SD memory, a min-SD memory, an extreme digital (xD) memory, a multi-media card (MMC), or a Memory Stick™. The external memory 234 may be functionally or physically connected with the electronic device 201 via various interfaces.

For example, the sensor module 240 may measure a physical quantity or detect an operational state of the electronic device 201, and the sensor module 240 may convert the measured or detected information into an electrical signal. The sensor module 240 may include at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red-green-blue (RGB) sensor, a bio sensor 240I, a temperature/humidity sensor 240J, an illumination sensor 240K, or an Ultra Violet (UV) sensor 240M. Additionally or alternatively, the sensor module 240 may include, e.g., an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. According to an embodiment of the present disclosure, the electronic device 201 may further include a processor configured to control the sensor module 240 as part of the processor 210 or separately from the processor 210, and the electronic device 1801 may control the sensor module 240 while the processor 210 is in a sleep mode.

The input device or unit 250 may include, e.g., a touch panel 252, a (digital) pen sensor 254, a key 256, or an ultrasonic input device 258. The touch panel 252 may use at least one of capacitive, resistive, infrared, or ultrasonic methods. The touch panel 252 may further include a control circuit. The touch panel 252 may further include a tactile layer and may provide a user with a tactile reaction. The (digital) pen sensor 254 may include, e.g., a part of a touch panel or a separate sheet for recognition. The key 256 may include e.g., a physical button, optical key or key pad. The ultrasonic input device 258 may sense an ultrasonic wave generated from an input tool through a microphone (e.g., the microphone 288) to identify data corresponding to the sensed ultrasonic wave.

The display 260 (e.g., the display 160) may include a panel 262, a hologram device 264, a projector 266, and/or a control circuit for controlling the same. The panel 262 may be implemented to be flexible, transparent, or wearable. The panel 262, together with the touch panel 252, may be configured in one or more modules. According to an embodiment of the present disclosure, the panel 262 may include a pressure sensor (or pose sensor) that may measure the strength of a pressure by the user's touch. The pressure sensor may be implemented in a single body with the touch panel 252 or may be implemented in one or more sensors separate from the touch panel 252. The hologram device 264 may make three dimensional (3D) images (holograms) in the air by using light interference. The projector 266 may display an image by projecting light onto a screen. The screen may be, for example, located inside or outside of the electronic device 201. The interface 270 may include e.g., a high definition multimedia interface (HDMI) 272, a USB 274, an optical interface 276, or a D-subminiature (D-sub) 278. The interface 270 may be included in e.g., the communication interface 170 shown in FIG. 1. Additionally or alternatively, the interface 270 may include a mobile high-definition link (MHL) interface, a secure digital (SD) card/multimedia card (MMC) interface, or infrared data association (IrDA) standard interface.

The audio module 280 may converting, e.g., a sound signal into an electrical signal and vice versa. At least a part of the audio module 280 may be included in e.g., the input/output interface 145 as shown in FIG. 1. The audio module 280 may process sound information input or output through e.g., a speaker 282, a receiver 284, an earphone 286, or a microphone 288.

For example, the camera module 291 may be a device for capturing still images and videos, and may include, according to an embodiment of the present disclosure, one or more image sensors (e.g., front and back sensors), a lens, an image signal processor (ISP), or a flash such as an LED or xenon lamp.

The power manager module 295 may manage power of the electronic device 201, for example. According to an embodiment of the present disclosure, the power manager module 295 may include a power management Integrated circuit (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part (e.g., the processor 210) of the electronic device, including e.g., a booting state, a message state, or recharging state. The motor 298 may convert an electric signal to a mechanical vibration and may generate a vibrational or haptic effect. The electronic device 201 may include a mobile TV supporting device (e.g., a GPU) that may process media data as per, e.g., digital multimedia broadcasting (DMB), digital video broadcasting (DVB), or mediaFlo™ standards. Each of the aforementioned components of the electronic device may include one or more parts, and a name of the part may vary with a type of the electronic device. According to various embodiments, the electronic device (e.g., the electronic device 201) may exclude some elements or include more elements, or some of the elements may be combined into a single entity that may perform the same function as by the elements before combined.

Figure 3:
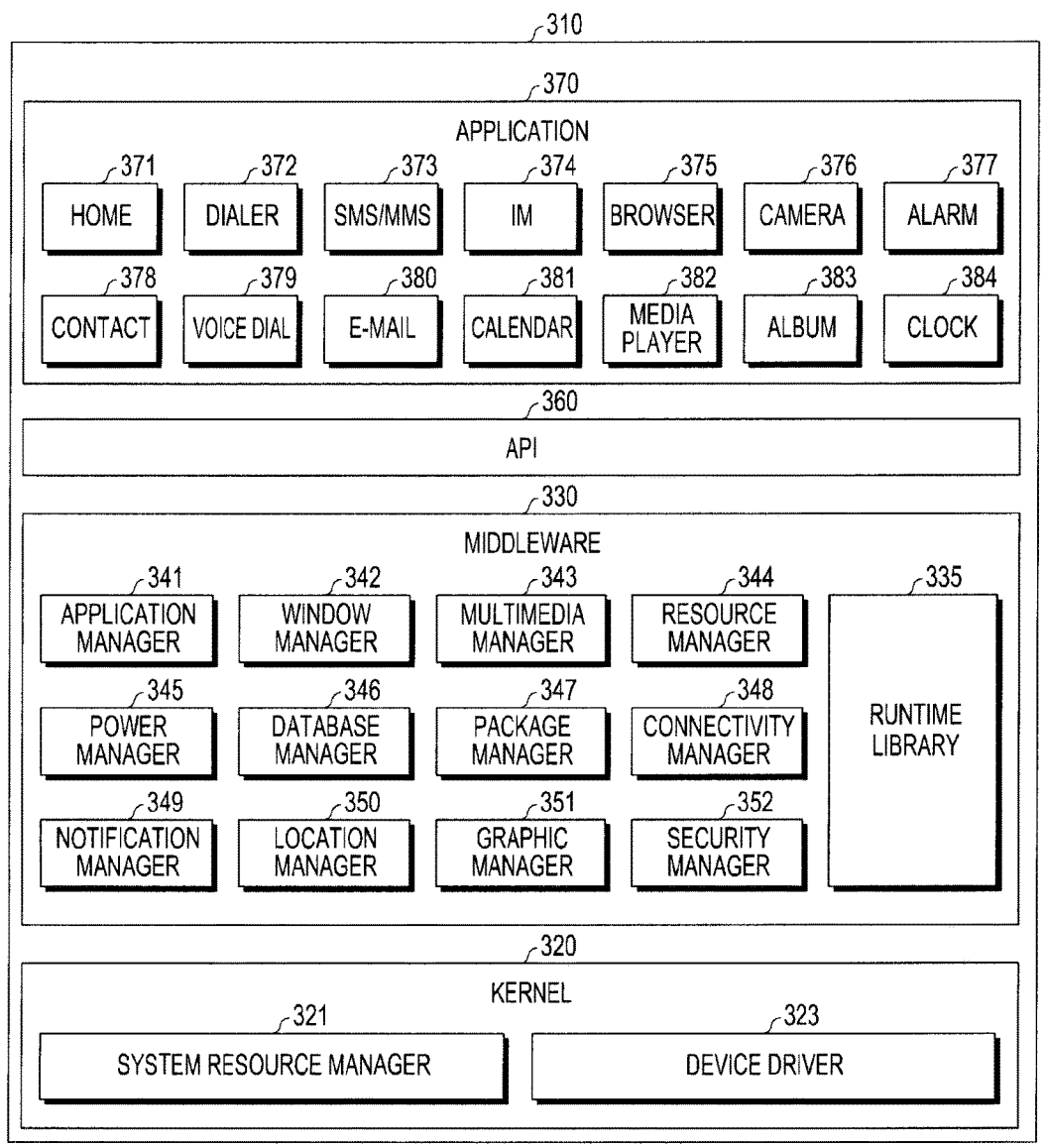
FIG. 3 is a block diagram illustrating a program module according to an embodiment of the present disclosure.

FIG. 3 is a block diagram illustrating a program module according to an embodiment of the present disclosure; According to an embodiment of the present disclosure, the program module 310 (e.g., the program 140) may include an operating system (OS) controlling resources related to the electronic device (e.g., the electronic device 101) and/or various applications (e.g., the application 147) driven on the operating system. The operating system may include, e.g., Android™, iOS™, Windows™, Symbian™, Tizen™, or Bada™. Referring to FIG. 3, the program module 310 may include a kernel 320 (e.g., the kernel 141), middleware 330 (e.g., the middleware 143), an API 360 (e.g., the API 145), and/or an application 370 (e.g., the application program 147). At least a part of the program module 310 may be preloaded on the electronic device or may be downloaded from an external electronic device (e.g., the electronic devices 102 and 104 or server 106).

The kernel 320 may include, e.g., a system resource manager 321 or a device driver 323. The system resource manager 321 may perform control, allocation, or recovery of system resources. According to an embodiment of the present disclosure, the system resource manager 321 may include a process managing unit, a memory managing unit, or a file system managing unit. The device driver 323 may include, e.g., a display driver, a camera driver, a Bluetooth driver, a shared memory driver, a USB driver, a keypad driver, a Wi-Fi driver, an audio driver, or an inter-process communication (IPC) driver. The middleware 330 may provide various functions to the application 370 through the API 360 so that the application 370 may use limited system resources in the electronic device or provide functions jointly required by applications 370. According to an embodiment of the present disclosure, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler in order to add a new function through a programming language while, e.g., the application 370 is being executed. The runtime library 335 may perform input/output management, memory management, or arithmetic function processing. The application manager 341 may manage the life cycle of, e.g., the applications 370. The window manager 342 may manage GUI resources used on the screen. The multimedia manager 343 may grasp formats necessary to play media files and use a codec appropriate for a format to perform encoding or decoding on media files. The resource manager 344 may manage the source code or memory space of the application 370. The power manager 345 may manage, e.g., the battery capability or power and provide power information necessary for the operation of the electronic device. According to an embodiment of the present disclosure, the power manager 345 may interwork with a basic input/output system (BIOS). The database manager 346 may generate, search, or vary a database to be used in the applications 370. The package manager 347 may manage installation or update of an application that is distributed in the form of a package file.

The connectivity manager 348 may manage, e.g., wireless connectivity. The notification manager 349 may provide an event, e.g., arrival message, appointment, or proximity alert, to the user. The location manager 350 may manage, e.g., locational information on the electronic device. The graphic manager 351 may manage, e.g., graphic effects to be offered to the user and their related user interface. The security manager 352 may provide system security or user authentication, for example. According to an embodiment of the present disclosure, the middleware 330 may include a telephony manager for managing the voice or video call function of the electronic device or a middleware module able to form a combination of the functions of the above-described elements. According to an embodiment of the present disclosure, the middleware 330 may provide a module specified according to the type of the operating system. The middleware 330 may dynamically omit some existing components or add new components. The API 360 may be a set of, e.g., API programming functions and may have different configurations depending on operating systems. For example, in the case of Android or iOS, one API set may be provided per platform, and in the case of Tizen, two or more API sets may be offered per platform.

The application 370 may include an application that may provide, e.g., a home 371, a dialer 372, an SMS/MMS 373, an instant message (IM) 374, a browser 375, a camera 376, an alarm 377, a contacts app 378, a voice dialer 379, an email app 380, a calendar 381, a media player 382, an album 383, or a clock 384, a health-care (e.g., measuring the degree of workout or blood sugar), or provision of environmental information (e.g., provision of air pressure, moisture, or temperature information). According to an embodiment of the present disclosure, the application 370 may include an information exchanging application supporting information exchange between the electronic device and an external electronic device. Examples of the information exchange application may include, but is not limited to, a notification relay application for transferring specific information to the external electronic device, or a device management application for managing the external electronic device. For example, the notification relay application may transfer notification information generated by other application of the electronic device to the external electronic device or receive notification information from the external electronic device and provide the received notification information to the user. For example, the device management application may install, delete, or update a function (e.g., turn-on/turn-off the external electronic device (or some elements) or adjusting the brightness (or resolution) of the display) of the external electronic device communicating with the electronic device or an application operating on the external electronic device. According to an embodiment of the present disclosure, the application 370 may include an application (e.g., a health-care application of a mobile medical device) designated according to an attribute of the external electronic device. According to an embodiment of the present disclosure, the application 370 may include an application received from the external electronic device. At least a portion of the program module 310 may be implemented (e.g., executed) in software, firmware, hardware (e.g., the processor 210), or a combination of at least two or more thereof and may include a module, program, routine, command set, or process for performing one or more functions.

Figure 4:
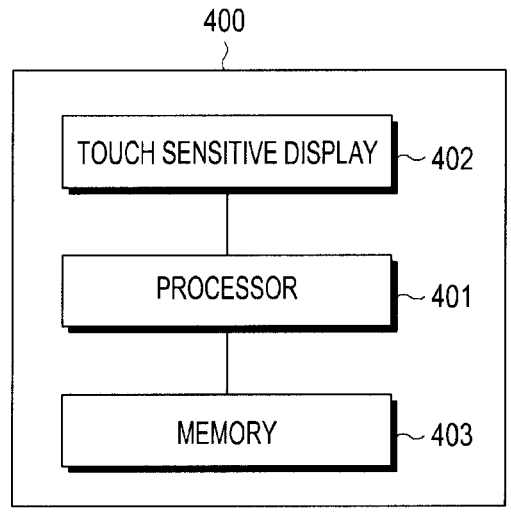
FIG. 4 is a view illustrating a configuration of an electronic device according to an embodiment of the present disclosure.

FIG. 4 is a view illustrating a configuration of an electronic device according to an embodiment of the present disclosure.

Referring to FIG. 4, the electronic device 400 may include a processor 401, a touch sensitive display 402, and a memory 403.

According to an embodiment of the present disclosure, the processor 401 may detect a first gesture inputted onto the touch sensitive display 402 while an object is displayed on the touch sensitive display 402 and control a first function corresponding to the first gesture and the object according to a second gesture inputted onto the touch sensitive display 402.

According to an embodiment of the present disclosure, the processor 401 may display at least one object (e.g., a sound volume setting screen, display brightness setting screen, time setting screen, application icon, or application running screen) on the touch sensitive display 402. The processor 401 may display at least one object by an input (e.g., a key input or gesture input including, e.g., a touch input, drag input, swipe input, or a combination of at least two or more thereof) for displaying (or invoking) at least one object. The processor 401 may select or focus at least part of the object according to an input (e.g., a touch input) for selecting at least part of the object displayed on the touch sensitive display 402. When the first gesture (e.g., a touch, drag, swipe, or a combination of at least two or more thereof) is inputted onto the touch sensitive display 402, the processor 401 may detect a first function corresponding to at least one object among a plurality of preset functions corresponding to the first gesture and invoke the determined first function. The plurality of preset functions (or a list of the plurality of functions) may be invoked according to a preset order. The preset order may be a loopable order. When the first function is determined by the input of the first gesture while the object is displayed, the processor 401 may set an order (e.g., a first order) of the first function among a plurality of functions and firstly invoke the first function according to the set order of the first function. The plurality of functions have a preset order and the preset order may be utilized to select or move amongst the plurality of functions until the utilization of the object is terminated (e.g., until the setting screen is terminated or the execution of an application is terminated). For example, where the plurality of functions, e.g., function A, function B, function C, and function D are set to be invoked in the order of functions A, B, C, and D, if function B is determined to be the first function, function B may be set to come first in order so that the functions may be invoked in the order of functions B, A, C, and D.

The processor 401 may display a menu (or image) for notifying of the invoked first function on the touch sensitive display 402.

When a second gesture for controlling the first function is inputted onto the touch sensitive display 402, the processor 401 may adjust a set value (or attribute value) of the first function as per the second gesture and control the first function corresponding to the adjusted set value. The first gesture and the second gesture may be the same or different from each other.

For example, where the object displayed on the touch sensitive display 402 is a sound volume setting screen, and an entity (e.g., a seek bar) for varying the set value for the sound volume of the sound setting screen is selected or focused, the processor 401, when the first gesture (e.g., a three-finger swipe left-right or a three-finger touch and left-right drag) is inputted onto the touch sensitive display 402, may detect the first function related to the selected entity or object among a plurality of functions (e.g., a display brightness adjusting function, text reading function, personal information protecting function, or sound volume adjusting function) preset corresponding to the first gesture (e.g., a three-finger swipe left-right or a three-finger touch and left-right drag). Where the detected first function is the sound volume adjusting function, the processor 401 may invoke the sound volume adjusting function and display, on the touch sensitive display 402, a menu (or image) including a phrase related to the invoked sound volume adjusting function, e.g., "adjust sound volume," for a predetermined time. When a second gesture (e.g., a single-finger swipe up or down, or a single-finger touch and drag up or down) is inputted onto the touch sensitive display 402, the processor 401 may adjust (or vary) the set sound volume value (or sound attribute value) according to the second gesture (e.g., a single-finger swipe up or down, or a single-finger touch and drag up or down) and turn up or down the sound volume corresponding to the adjusted set sound volume value. The processor 401 may adjust the set sound volume value and display the same on the touch sensitive display 402, corresponding to the adjusted set sound volume value.

For example, where the entity selected for controlling the sound volume setting on the sound volume setting screen is a circular dial, when the second gesture (e.g., a single-finger swipe up or down, or a single-finger touch and drag up or down) is inputted onto the touch sensitive display 402, the processor 401 may adjust (or vary) the set sound volume value as per the second gesture and adjust the set sound volume value of the circular dial and display the same on the touch sensitive display 402 corresponding to the adjusted set sound volume value.

According to an embodiment of the present disclosure, the processor 401 may determine the attribute for the object or the user preference for the object to determine the first function corresponding to the object. The attribute may be information indicating a function (or operation) related to the object. The user preference may be information for determining the user's most preferred function based on usage information, such as the number of times in which functions related to the object are selected or executed or the time of the execution. Or, the user preference may be information related to a function (or operation) that the user commonly or typically uses for the object.

For example, where an entity (e.g., a seek bar) for varying the set sound volume value of the sound volume setting screen is selected or focused, when the first gesture (e.g., a three-finger swipe left or right, or a three-finger touch and drag left or right) is inputted onto the touch sensitive display 402, the processor 401 may determine the attribute for the sound volume setting screen (or seek bar). Where the determined attribute is "adjust sound volume," the processor 401 may detect the first function corresponding to the determined attribute. Where the detected first function is a "sound volume adjusting function," the processor 401 may invoke the sound volume adjusting function, and when the second gesture (e.g., a single-finger swipe up or down, or a single-finger touch and drag up or down) is inputted onto the touch sensitive display 402, the processor 401 may control the sound volume adjusting function as per the input of the second gesture.

For example, where an entity (e.g., a seek bar) for varying the set sound volume value of the sound volume setting screen is selected or focused, when the first gesture (e.g., a three-finger swipe left or right, or a three-finger touch and drag left or right) is inputted onto the touch sensitive display 402, the processor 401 may determine the user preference for the sound volume setting screen (or seek bar). The processor 401 may gather usage information, such as the number of times in which the functions related to the sound volume setting screen are selected or executed or the time of the execution, analyze the gathered usage information, and detect the first function. For example, the first function may be a function that the user most prefers. Or, the first function may be a function that is commonly or typically used corresponding to the sound volume setting screen (or seek bar).

Where the detected first function is a "sound volume adjusting function," the processor 401 may invoke the sound volume adjusting function, and when the second gesture (e.g., a single-finger swipe up or down, or a single-finger touch and drag up or down) is inputted onto the touch sensitive display 402, the processor 401 may control the sound volume adjusting function as per the input of the second gesture.

For example, where an entity (e.g., a seek bar) for varying the set sound volume value of the sound volume setting screen is selected or focused, when the first gesture (e.g., a three-finger swipe left or right, or a three-finger touch and drag left or right) is inputted onto the touch sensitive display 402, the processor 401 may determine the user intention (e.g., an intended operation) for the sound volume setting screen (or seek bar) based on a user selection. For example, when the seek bar of the sound volume setting screen is selected, the processor 401 may determine that the user intention (e.g., the intended operation) is to vary the set sound volume value and determine the first function based on the user intention determined. Where the determined first function is a "sound volume adjusting function," the processor 401 may invoke the sound volume adjusting function, and when the second gesture (e.g., a single-finger swipe up or down, or a single-finger touch and drag up or down) is inputted onto the touch sensitive display 402, the processor 401 may control the sound volume adjusting function as per the input of the second gesture.

According to an embodiment of the present disclosure, the processor 401 determines the attribute or user preference for the object (or a selected or focused entity) to detect the first function corresponding to the first gesture (e.g., a three-finger swipe left or right, or a three-finger touch and drag left or right) and the object. However, the processor 401 may determine both the attribute and the user preference.

According to an embodiment of the present disclosure, the first function related to the object (or a selected or focused entity) may be determined by the user preference and/or the attribute related to the object (or a selected or focused entity) or may be set by the user.

According to an embodiment of the present disclosure, the processor 401 may output a menu (or image) including a voice or phrase for notifying of a set value (or attribute value) for the first function upon adjusting the set value (or attribute value). For example, upon varying the set sound volume value, the processor 401 may output a voice for notifying of the set value, such as "sound volume 40%," or display a menu (or image) including a corresponding phrase on the touch sensitive display 402.

According to an embodiment of the present disclosure, the processor 401 may run a screen reader function by an input for invoking a screen reader function on the touch sensitive display 402. The screen reader function may be a function that may provide a voice guide (or output) for the content on the screen or information that visually impaired persons have entered, such as e.g., the position of a touch input or content entered through a touch keyboard. For example, the processor 401 may output in a voice information (e.g., the name of an application icon, the name of a set screen, or the phrase displayed on the set screen) about an object selected or focused as per an input to select or focus at least one object (e.g., an application icon, menu, or running screen) displayed on the touch sensitive display 402.

According to an embodiment of the present disclosure, the processor 401 may run a screen reader function by an input for invoking a screen reader function on the touch sensitive display 402. When a third gesture (e.g., a three-finger swipe left or right, or a three-finger touch and drag left or right) is inputted onto the touch sensitive display 402 to invoke the second function, the processor 401 may detect and invoke the second function according to a preset order among the plurality of functions. For example, where the plurality of functions are set in the order of a display brightness adjusting function, sound volume adjusting function, and personal information protecting function, the processor 401 may determine that the display brightness adjusting function, which comes first in order, is the second function and may invoke the function. The processor 401 may display a menu (or image) for notifying of the display brightness adjusting function, which is the second function invoked, on the touch sensitive display 402. When a fourth gesture (e.g., a two-finger swipe up or down, or a two-finger touch and drag up or down) for controlling the second function is inputted onto the touch sensitive display 402, the processor 401 may adjust the set brightness value (or brightness attribute value) according to the inputted fourth gesture (e.g., a two-finger swipe up or down, or a two-finger touch and drag up or down) and set the brightness of the display to darken or brighten corresponding to the adjusted set brightness value. For example, when a two-finger swipe up is inputted, the processor 401 may control the display to have an increased brightness, and when a two-finger swipe down is inputted, the processor 401 may control the display to have a decreased brightness.

According to an embodiment of the present disclosure, when a third gesture (e.g., a three-finger swipe left or right, or a three-finger touch and drag left or right) for invoking the second function is inputted onto the touch sensitive display 402, the processor 401 may detect and invoke the second function corresponding to the inputted third gesture (e.g., a three-finger swipe left or right, or a three-finger touch and drag left or right) among the plurality of functions, and when a fifth gesture (e.g., a single-finger swipe left or right, or a single-finger touch and drag left or right) for invoking the third function that comes next in order to the second function is inputted onto the touch sensitive display 402, the processor 401 may detect and invoke the third function that comes next in order to the second function, corresponding to the inputted fifth gesture (e.g., a single-finger swipe left or right, or a single-finger touch and drag left or right). The processor 401 may display a menu for notifying of the invoked third function on the touch sensitive display 402.

For example, where the plurality of functions are set in the order of a display brightness adjusting function, sound volume adjusting function, and personal information protecting function, the processor 401 may determine that the display brightness adjusting function, which comes first in order, is the second function, invoke the display brightness adjusting function, and when the fifth gesture (e.g., a single-finger swipe left or right, or a single-finger touch and drag left or right) for invoking the third function that comes next in order to the second function is inputted onto the touch sensitive display 402, the processor 401 may determine that the sound volume adjusting function that comes second in order is the third function.

According to an embodiment of the present disclosure, although the plurality of functions include at least one function controlled according to the input of the fourth gesture, the functions may further include at least one function controlled as per the input of the second gesture. Such multiple functions may be invoked by a particular gesture according to a preset order.

For example, when the second gesture (e.g., a three-finger swipe left or right, or a three-finger touch and drag left or right) is inputted onto the touch sensitive display 402, the processor 401 may determine a function that comes first in order among the plurality of functions or a function selected before, corresponding to the second gesture (e.g., a third-finger touch and drag left or right) and display a menu corresponding to the determined function on the touch sensitive display 402. When the fifth gesture (e.g., a single-finger swipe left or right, or a single-finger touch and drag left or right) for invoking a function coming next to the determined function is inputted, the processor 401 may determine and invoke a function that comes next in order to the function, which comes second in order, or function previously selected. The function coming second in order, although being a function invoked as per the input of the first gesture and object, may also be invoked according to the order. The plurality of functions (e.g., a function list) may be invoked according to a preset order that may be loopable.

According to an embodiment of the present disclosure, when the first gesture (e.g., a three-finger swipe left or right, or a three-finger touch and drag left or right) is inputted onto the inputted onto the touch sensitive display 402, the processor 401 may detect and invoke the second function according to a preset order of the plurality of functions except the first function, which is invoked as per the input of the first gesture and object, and display a menu corresponding to the invoked second function onto the touch sensitive display 402.

For example, where the plurality of functions are set in the order of a display brightness adjusting function, sound volume adjusting function, and personal information protecting function, and the sound volume adjusting function is the first function invoked corresponding to the input of the first gesture and object, the processor 401 may invoke the display brightness adjusting function when the third grant (e.g., a three-finger swipe left or right, or a three-finger touch and drag left or right) is inputted onto the touch sensitive display 402. When the fifth gesture (e.g., a single-finger swipe left or right, or a single-finger touch and drag left or right) for invoking a function that comes next in order to the display brightness adjusting function is inputted onto the touch sensitive display 402, the processor 401 may abstain from invoking the sound volume adjusting function and invoke the personal information protecting function that comes next in order.

According to an embodiment of the present disclosure, where there are two or more functions corresponding to at least part selected from the object displayed on the touch sensitive display 402, the processor 401 may first invoke any one of the two or more functions and then invoke a function that comes next to the function invoked as per the input of a particular gesture.

For example, where the first function corresponding to at least part selected from the object displayed on the touch sensitive display 402 is function N and function M, the processor 401 may invoke function N of functions N and M corresponding to, at least, the selected part of the object when the first gesture (e.g., a three-finger swipe left or right, or a three-finger touch and drag left or right) inputted onto the touch sensitive display 402. The processor 401 may display a menu (or image) for the invoked function N on the touch sensitive display 402. When a second gesture (e.g., a single-finger swipe up or down, or a single-finger touch and drag up or down) is inputted onto the touch sensitive display 402, the processor 401 may control function N according to the second gesture (e.g., a single-finger swipe up or down, or a single-finger touch and drag up or down). When the fifth gesture (e.g., a single-finger swipe left or right, or a single-finger touch and drag left or right) for invoking a function that comes next to function N is inputted onto the touch sensitive display 402, the processor 401 may invoke function M and display, on the touch sensitive display 402, a menu (or image) for function M invoked. When a second gesture (e.g., a single-finger swipe up or down, or a single-finger touch and drag up or down) is inputted onto the touch sensitive display 402, the processor 401 may control function M according to the second gesture (e.g., a single-finger swipe up or down, or a single-finger touch and drag up or down).

According to an embodiment of the present disclosure, the processor 401 may display an executed application on the touch sensitive display 402 and select at least part of the displayed application. For example, when a gesture (e.g., a single touch) for selection is inputted onto the touch sensitive display 402, the electronic device 400 (e.g., the processor 401) may select or focus any one of various application icons or widgets displayed, and when a gesture (e.g., two touches) for running the selected one is inputted, the electronic device 400 (e.g., the processor 401) may run the application related to the selected application icon or widget. The electronic device 400 (e.g., the processor 401) may display a running screen for the executed application on the touch sensitive display 402 and detect a first gesture input on the touch sensitive display 402.

The processor 401 may detect and invoke the first function related to at least part selected from a plurality of functions (or a function list) related to the executed application and display, on the touch sensitive display 402, a menu indicating the first function. For example, when a text input area is selected while a running screen of a memo application is displayed on the touch sensitive display 402, and the first gesture is inputted, the processor 401 may determine that a function (e.g., a text input function) related to a text input area selected among at least one function available on the memo application is the first function and invoke the function. The processor 401 may display, on the touch sensitive display 402, a menu (or image) for indicating the text input function. According to an embodiment of the present disclosure, the processor 401 may display, on the touch sensitive display 402, a list of menus indicating a plurality of functions that are arrayed in order from the text input function.

When the second function for controlling the invoked first function is inputted onto the touch sensitive display 402, the processor 401 may control the first function as per the inputted second gesture. For example, when a gesture for controlling the text input function is inputted onto the touch sensitive display 402, the processor 401 may perform the text input function as per the inputted gesture.

According to an embodiment of the present disclosure, when a particular application is executed so that a running screen is displayed on the touch sensitive display 402, and the first gesture (e.g., a three-finger swipe left or right, or a three-finger touch and drag left or right) inputted onto the touch sensitive display 402, the processor 401 may first invoke a preset function (or a function related to the nature of the running application) according to the nature of the running application. For example, the processor 401 may run a call application for a phone talk according to the reception or dispatch of a call and display a running screen of the call application on the touch sensitive display 402. When the first gesture (e.g., a three-finger swipe left or right, or a three-finger touch and drag left or right) inputted onto the touch sensitive display 402, the processor 401 may determine and invoke a function (e.g., a speaker phone function, call recording function, or dial display function) related to the nature (e.g., calling) of the call application and display, on the touch sensitive display 402, a menu indicating the invoked function. When the second gesture (e.g., a single-finger swipe up or down, or a single-finger touch and drag up or down) inputted onto the touch sensitive display 402, the processor 401 may perform the invoked function as per the inputted second gesture. The processor 401 may also determine a function related to the nature of the first application as per the input of the first gesture, invoke the determined function, and immediately run the function without the input of the second gesture.

According to an embodiment of the present disclosure, when a particular application is executed so that a running screen is displayed on the touch sensitive display 402, and at least part is selected from the displayed running screen, the processor 401 may determine the attribute of the running application and invoke an application function corresponding to the determined attribute. For example, the processor 401 may access a search portal website through a web browser to display an access screen or run the search portal website to display a running screen on the touch sensitive display 402. When at least part (e.g., text, images, icons, or thumbnails constituting the access screen or running screen) of the access screen or running screen is selected on the touch sensitive display 402, and the first gesture (e.g., a three-finger swipe left or right, or a three-finger touch and drag left or right) is inputted, the processor 401 may invoke a function (e.g., a section search, list search, or control search) related to the nature (e.g., search) of the access screen or running screen and display, on the touch sensitive display 402, a menu indicating the invoked function. When the second gesture (e.g., a single-finger swipe up or down, or a single-finger touch and drag up or down) inputted onto the touch sensitive display 402, the processor 401 may perform the invoked function as per the inputted second gesture.

According to an embodiment of the present disclosure, although the first gesture, second gesture, third gesture, fourth gesture, fifth gesture, and the other gestures are described as differing from one another, some of them may be implemented to be the same gesture. For example, although the first gesture is described as being a three-finger touch and drag left or right, it may also be a three-finger touch and drag up or down. The second gesture and fourth gesture may be implemented to be the same gesture, e.g., a single-finger touch and drag up or down. The gestures may be implemented to be a combination of two or more of various single-finger touches, two-finger touches, three-finger touches, one-finger drags, two-finger drags, three-finger drags, one-finger swipes, two-finger swipes, three-finger swipes, and hovering or by a component of more gestures, but is not limited thereto.

According to an embodiment of the present disclosure, in order to detect the first function corresponding to the object, the processor 401 may request a server (e.g., the server 106) to detect the first function corresponding to the object. The server (e.g., the server 106) may gather usage data for at least one electronic device (e.g., big data, such as the number of times in which a function is selected or executed, the time of execution of a function, the number of times in which an application is selected or executed, the time of execution of an application, or the number of times in which functions are used upon execution of a particular application). According to the request, the server (e.g., the server 106) may detect the first function corresponding to the requested object using the gathered usage data.

For example, where an entity (e.g., a seek bar) for varying the set sound volume value of the sound volume setting screen is selected or focused, when the first gesture (e.g., a three-finger swipe left or right or a three-finger touch and drag left or right) is inputted onto the touch sensitive display 402, the processor 401 may request the server (e.g., the server 106) to determine the first function corresponding to the first gesture and the object. Receiving the request, the server (e.g., the server 106) may determine the nature of the object, the user preference, or the user intention based on the gathered usage data and determine the first function corresponding to the attribute, user preference, or user intention determined. Where the determined first function is a "sound volume adjusting function," the server (e.g., the server 106) may deliver a response including information about the determined first function (e.g., the sound volume adjusting function) to the electronic device 400. Receiving the response, the processor 401 may invoke the sound volume adjusting function corresponding to the first function based on the received response and display, on the touch sensitive display 402, a menu (or image) indicating the invoked sound volume adjusting function.

According to an embodiment of the present disclosure, the processor 401 may previously request and store the information about the first function determined through the server (e.g., the server 106).

The touch sensitive display 402 may receive a touch, gesture, proximity, swipe, hovering, or a combination of two or more thereof using part (e.g., a finger) of the user's body or an electronic pen.

The memory 403 may store all the information used to process the gesture input.

According to an embodiment of the present disclosure, an electronic device 400 may include a touch sensitive display 402, a processor 401, and a memory 403 including instructions executable by the processor 401 to detect a first gesture input to the touch sensitive display 402 while an object is displayed on the same, in response to the first gesture input, detected a first function corresponding to the object from among a plurality of functions, and in response to detecting a second gesture input to the touch sensitive display 402, control the detected first function according to the second gesture input.

Figure 5:
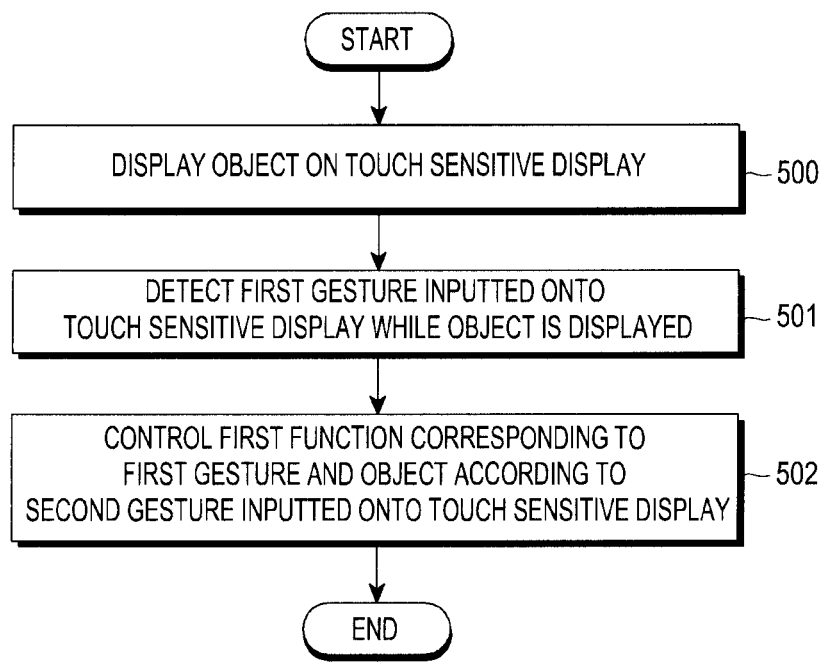
FIG. 5 is a flowchart illustrating a method for processing a gesture by an electronic device according to an embodiment of the present disclosure.

FIG. 5 is a flowchart illustrating a method for processing a gesture by an electronic device according to an embodiment of the present disclosure.

According to an embodiment of the present disclosure, operations 500 to 502 may be performed by any one of the electronic device 101, 201, or 400, the server 106, the processor 120, 210, or 401, or the program module 310.

Referring to FIG. 5, in operation 500, the electronic device 400 (e.g., the processor 401) may display an object on the touch sensitive display 402. For example, the electronic device 400 (e.g., the processor 401) may display, on the touch sensitive display 402, an idle screen (or background screen), a function (or operation) setting screen (e.g., a sound volume settings screen, display brightness setting screen, or time setting screen), an application running screen (e.g., a memo application screen, calendar application screen, or web browser screen), and an object, such as an application icon. According to an embodiment of the present disclosure, the object is not limited as having been described above and may include various functions or applications.

In operation 501, the electronic device 400 (e.g., the processor 401) may detect a first gesture inputted onto the touch sensitive display 402 while the object is displayed on the touch sensitive display 402).

According to an embodiment of the present disclosure, the electronic device 400 (e.g., the processor 401) may select or focus at least part of the object according to an input for selecting the at least part of the object on the touch sensitive display 402, and when the first gesture is inputted onto the touch sensitive display 402, the electronic device 400 (e.g., the processor 401) may detect the first function related to the object among a plurality of functions. For example, when at least one entity (e.g., a number setting area) is selected or focused on the time setting screen displayed on the touch sensitive display 402, and the first gesture is inputted, the electronic device 400 (e.g., the processor 401) may determine the first function (e.g., a time setting function) corresponding to the time setting screen.

In operation 502, the electronic device 400 (e.g., the processor 401) may control the first function corresponding to the object and the first gesture according to a second gesture inputted onto the touch sensitive display 402. For example, the electronic device 400 (e.g., the processor 401) may adjust (or vary) the set time value for a time according to the second gesture and set the time according to the set time value adjusted.

Figure 6:
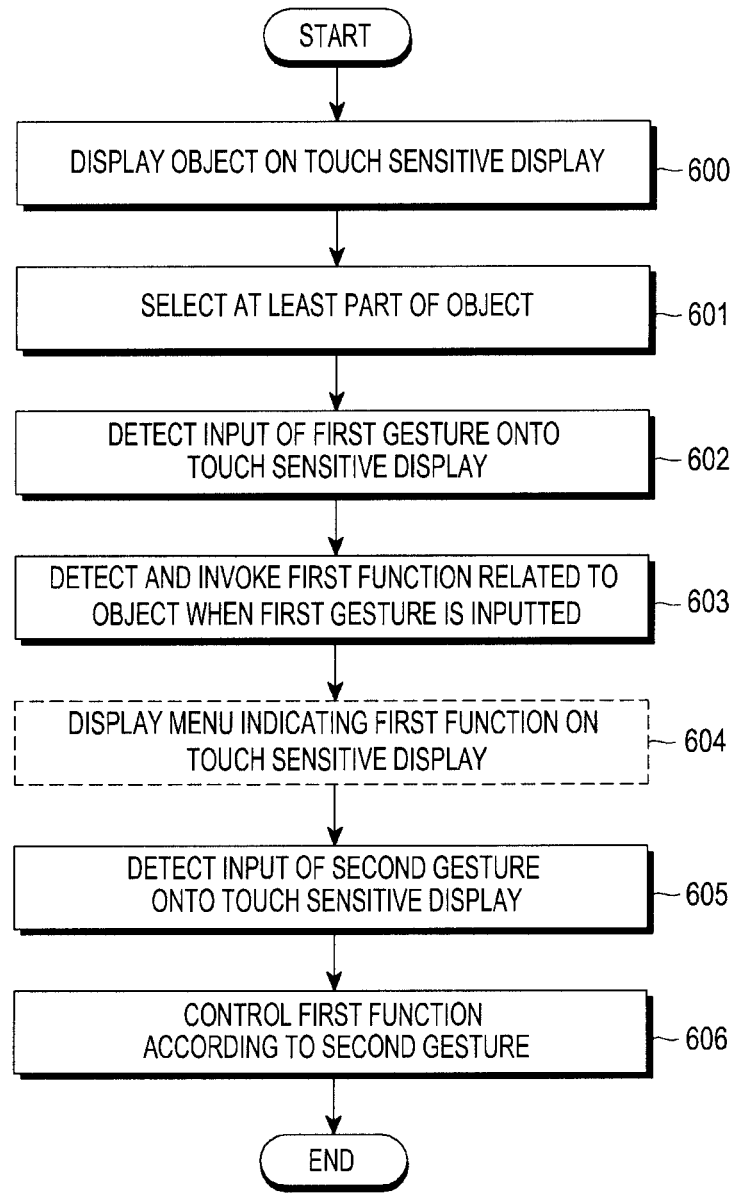
FIG. 6 is a flowchart illustrating a method for processing a gesture by an electronic device according to an embodiment of the present disclosure.

FIG. 6 is a flowchart illustrating a method for processing a gesture by an electronic device according to an embodiment of the present disclosure.

According to an embodiment of the present disclosure, operations 600 to 606 may be performed by any one of the electronic device 101, 201, or 400, the server 106, the processor 120, 210, or 401, or the program module 310.

Referring to FIG. 6, in operation 600, the electronic device 400 (e.g., the processor 401) may display an object on the touch sensitive display 402. The object may include, e.g., a sound volume setting screen, a display brightness setting screen, time setting screen, application icon, or application running screen, etc.

In operation 601, the electronic device 400 (e.g., the processor 401) may select at least part of the object. For example, the at least part of the object may include, e.g., a displayed graphical element such as a "seek bar" or "circular dial" for adjusting the sound volume setting within a sound volume setting screen, a seek bar for varying the brightness setting of the display brightness setting screen, selectable dialogues such as "change-time areas" for varying the time setting of the time setting screen, an application icon, or a word, phrase, area, or image selectable on the application running screen.

In operation 602, the electronic device 400 (e.g., the processor 401) may detect a first gesture input onto the touch sensitive display 402. For example, the electronic device 400 (e.g., the processor 401) may determine the first gesture for invoking a function related to the selected entity on the touch sensitive display 402.

In operation 603, the electronic device 400 (e.g., the processor 401) may detect and invoke the first function related to the object when the first gesture is inputted. For example, the electronic device 400 (e.g., the processor 401) may determine that a function (e.g., the sound volume adjusting function) for varying the sound volume setting of the sound volume setting screen is the first function and invoke the function. According to an embodiment of the present disclosure, the electronic device 400 (e.g., the processor 401) may also detect and invoke the first function related to the selected entity.

In operation 604, the electronic device 400 (e.g., the processor 401) may control a display to display a menu indicating the first function on the touch sensitive display 402. For example, the electronic device 400 (e.g., the processor 401) may display a menu (or image) indicating or notifying a user of the invoked first function (e.g., the sound volume adjusting function) on the touch sensitive display 402. Operation 604 may selectively be performed in some embodiments.

In operation 605, the electronic device 400 (e.g., the processor 401) may detect a second gesture input onto the touch sensitive display 402. The second gesture may be an input utilized to control the first function.

In operation 606, the electronic device 400 (e.g., the processor 401) may control the first function according to the second gesture. For example, the electronic device 400 (e.g., the processor 401) may control the function (e.g., the sound volume adjusting function) for adjusting the seek bar to adjust the set sound volume value (or sound volume attribute value) and set the sound volume according to the set sound volume value adjusted.

Figure 7A:
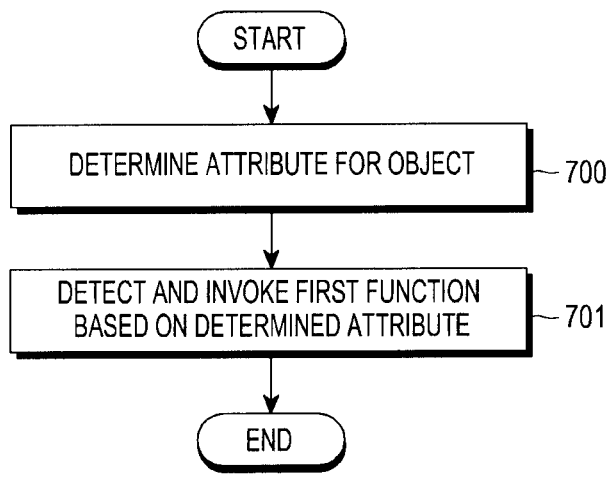
FIG. 7A, FIG. 7B and FIG. 7C are flowcharts illustrating a method for determining a first function by an electronic device according to an embodiment of the present disclosure.
Figure 7B:
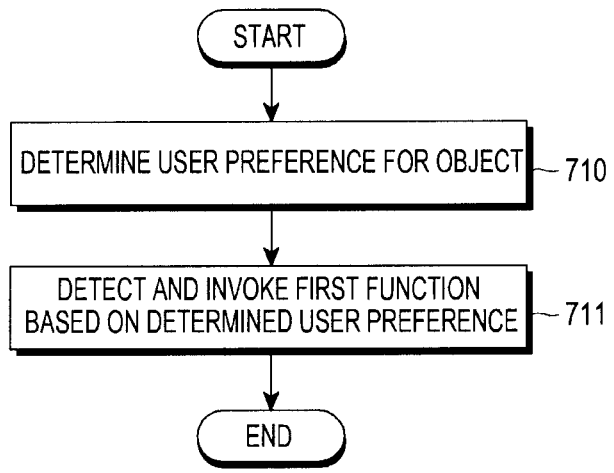
Figure 7C:
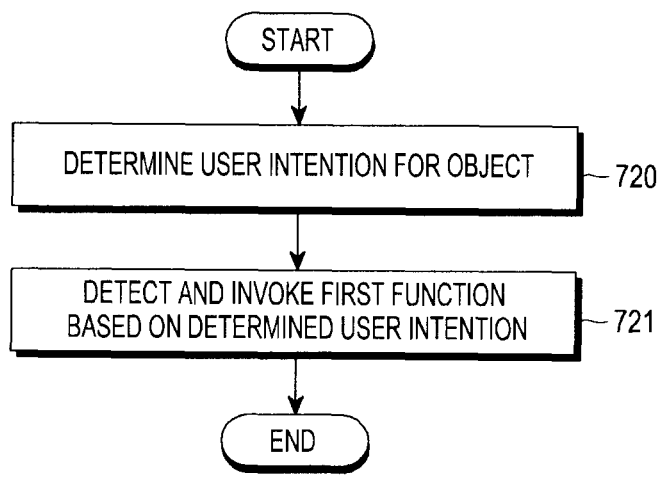

According to an embodiment of the present disclosure, a method is disclosed including detecting a first gesture input to a touch sensitive display 402 while an object is displayed on the same, in response to the first gesture input, detecting a first function corresponding to the object from among a plurality of functions, and in response to detecting a second gesture input to the touch sensitive display 402, controlling the detected first function according to the second gesture. FIGS. 7a to 7c are flowcharts illustrating a method for determining a first function by an electronic device according to an embodiment of the present disclosure.

According to an embodiment of the present disclosure, operations 700 and 701, operations 710 and 711, and operations 720 and 721 may be performed by any one of the electronic device 101, 201, or 400, the server 106, the processor 120, 210, or 401, or the program module 310.

Referring to FIG. 7a, in operation 700, the electronic device 400 (e.g., the processor 401) may determine an attribute for an object. For example, where an entity (e.g., a seek bar) for varying the set sound volume value of the sound volume setting screen is selected or focused, when a first gesture is inputted onto the touch sensitive display 402, the electronic device 400 (e.g., the processor 401) may determine an attribute for the sound volume setting screen. For example, the attribute for the sound volume setting screen may be "set sound volume."

In operation 701, the electronic device 400 (e.g., the processor 401) may detect and invoke the first function based on the determined attribute. For example, where the determined attribute is "set sound volume," the electronic device 400 (e.g., the processor 401) may determine that a function related to a sound volume setting among a plurality of functions is the first function and invoke the function. The function related to the sound volume setting may be a "sound volume adjusting function."

Referring to FIG. 7b, in operation 710, the electronic device 400 (e.g., the processor 401) may determine the user preference for an object. For example, where an entity (e.g., a seek bar) for varying the set sound volume value of the sound volume setting screen is selected or focused, when a first gesture is inputted onto the touch sensitive display 402, the processor 401 may determine the user preference for the sound volume setting screen. The processor 401 may gather usage information, such as the number of times in which the functions related to the sound volume setting screen are selected or executed or the time of the execution, analyze the gathered usage information, and determine the user preference on the functions related to the sound volume connection setting.

In operation 711, the electronic device 400 (e.g., the processor 401) may detect and invoke the first function based on the user preference that was determined. For example, the electronic device 400 (e.g., the processor 401) may determine that the function the user prefers most among a plurality of functions is the first function, and therefore invoke the function.

Referring to FIG. 7c, in operation 720, the electronic device 400 (e.g., the processor 401) may determine the user intention on an object. For example, where an entity (e.g., a seek bar) for varying the set sound volume value of the sound volume setting screen is selected or focused, e.g., by a first gesture inputted onto the touch sensitive display 402, the processor 401 may determine that the user intention is to vary the set sound volume value.

In operation 721, the electronic device 400 (e.g., the processor 401) may detect and invoke the first function based on the user intention that was determined. For example, the electronic device 400 (e.g., the processor 401) may determine that the sound volume adjusting function for varying the set sound volume value among the plurality of functions is the first function, and therefore invoke the function.

Figure 8:
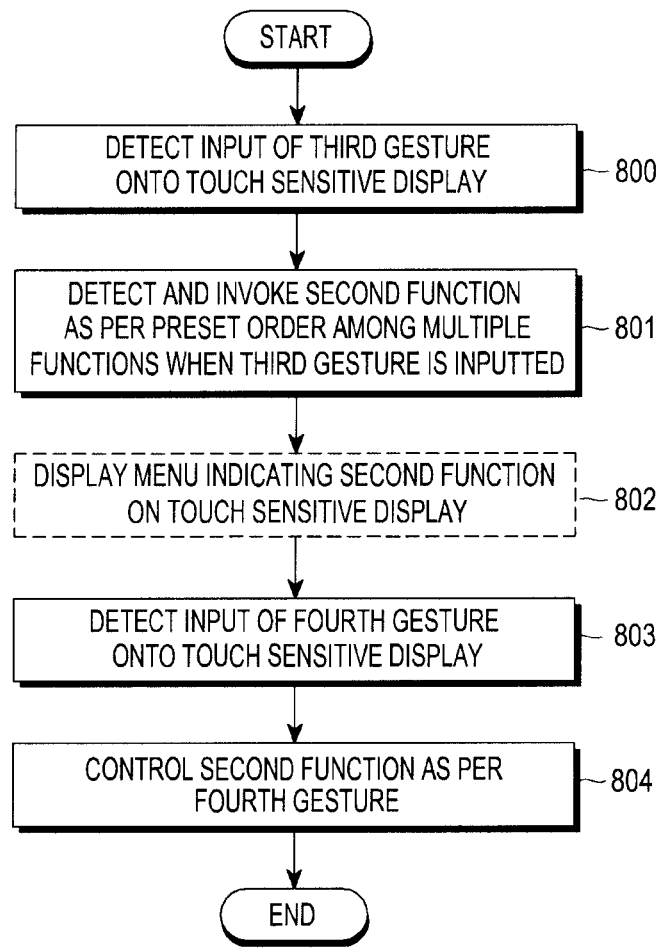
FIG. 8 is a flowchart illustrating a method for processing a gesture by an electronic device according to an embodiment of the present disclosure.

FIG. 8 is a flowchart illustrating a method for processing a gesture by an electronic device according to an embodiment of the present disclosure.

According to an embodiment of the present disclosure, operations 800 to 804 may be performed by any one of the electronic device 101, 201, or 400, the server 106, the processor 120, 210, or 401, or the program module 310.

Referring to FIG. 8, in operation 800, the electronic device 400 (e.g., the processor 401) may detect a third gesture input onto the touch sensitive display 402. The third gesture may be executed to invoke the second function according to a set order of a plurality of functions.

In operation 801, when the third gesture is inputted, the electronic device 400 (e.g., the processor 401) may detect and invoke the second function according to a set order (e.g., predetermined order) of the plurality of functions. For example, where the plurality of functions are set in the predetermined order of a display brightness adjusting function, sound volume adjusting function, and personal information protecting function, the electronic device 400 (e.g., the processor 401) may determine that the display brightness adjusting function is the second function and may invoke the function. Or, the electronic device 400 (e.g., the processor 401) may determine that a function invoked before is the second function and therefore invoke the function.

In operation 802, the electronic device 400 (e.g., the processor 401) may display a menu or other graphical element indicating the second function on the touch sensitive display 402. For example, the electronic device 400 (e.g., the processor 401) may display, on the touch sensitive display 402, a menu (e.g., a phrase, such as "adjust screen brightness," or an image including the same) indicating the display brightness adjusting function. Operation 803 may selectively be performed in some embodiments.

In operation 803, the electronic device 400 (e.g., the processor 401) may detect a fourth gesture input onto the touch sensitive display 402. The fourth gesture may be inputted to control the second function.

In operation 804, the electronic device 400 (e.g., the processor 401) may control the second function according to the fourth gesture. For example, the electronic device 400 (e.g., the processor 401) may adjust the set display brightness value according to the fourth gesture and set the display to brighten or darken corresponding to the set broadcast data value adjusted.

Figure 9:
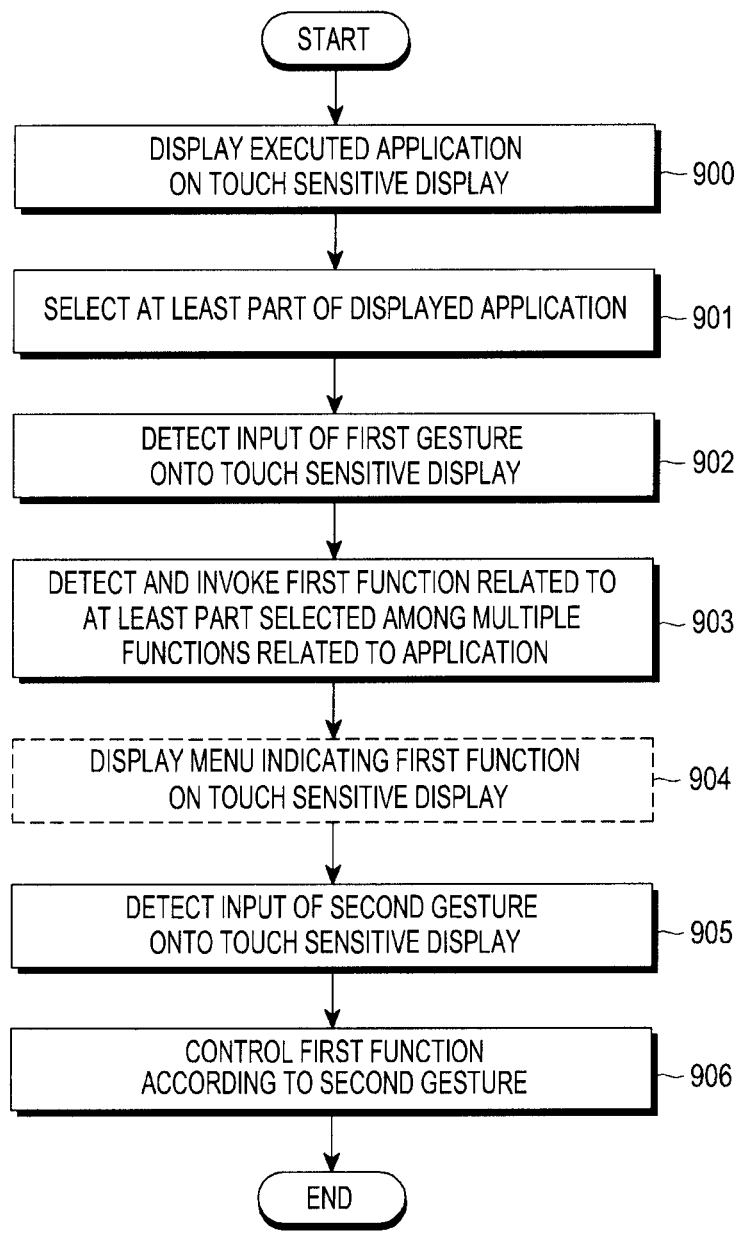
FIG. 9 is a flowchart illustrating a method for processing a gesture by an electronic device according to an embodiment of the present disclosure.

FIG. 9 is a flowchart illustrating a method for processing a gesture by an electronic device according to an embodiment of the present disclosure.

According to an embodiment of the present disclosure, operations 900 to 906 may be performed by any one of the electronic device 101, 201, or 400, the server 106, the processor 120, 210, or 401, or the program module 310.

Referring to FIG. 9, in operation 900, the electronic device 400 (e.g., the processor 401) may display an executed application on the touch sensitive display 402. For example, when a fourth gesture is inputted onto the touch sensitive display 402, the electronic device 400 (e.g., the processor 401) may select or focus any one of various application icons or widgets displayed, and when a fifth gesture is inputted, the electronic device 400 (e.g., the processor 401) may run an application related to the selected application icon. The electronic device 400 (e.g., the processor 401) may control the touch sensitive display 402 to display an execution screen for the executed application.

In operation 901, the electronic device 400 (e.g., the processor 401) may select at least part of the displayed application. For example, the electronic device 400 (e.g., the processor 401) may select an entity, such as a character, icon, image, or area, from the running screen displayed on the touch sensitive display 402.

In operation 902, the electronic device 400 (e.g., the processor 401) may detect a first gesture input onto the touch sensitive display 402. The first gesture may be the same gesture as the first gesture described above in connection with FIG. 5 or 6. According to an embodiment of the present disclosure, the first gesture may be a gesture different from the first gesture described above in connection with FIG. 5 or 6.

In operation 903, the electronic device 400 (e.g., the processor 401) may detect and invoke the first function related to at least some functions selected from a plurality of functions related to the application. For example, when a text input area is selected while a running screen of a memo application is displayed on the touch sensitive display 402, and the first gesture is inputted, the electronic device 400 (e.g., the processor 401) may determine that a function (e.g., a text input function) related to a text input area selected among at least one function available on the memo application is the first function and invoke the determined first function.

In operation 904, the electronic device 400 (e.g., the processor 401) may display a menu indicating the first function on the touch sensitive display 402. For example, the electronic device 400 (e.g., the processor 401) may display, on the touch sensitive display 402, a menu (or image) for indicating the text input function. According to an embodiment of the present disclosure, the electronic device 400 (e.g., the processor 401) may display, on the touch sensitive display 402, menus indicating a plurality of functions that are arrayed in order from the text input function.

In operation 905, the electronic device 400 (e.g., the processor 401) may detect a second gesture input onto the touch sensitive display 402. The second gesture may be inputted to run the first function.

In operation 906, the electronic device 400 (e.g., the processor 401) may control the first function according to the second gesture. For example, when the second gesture inputted onto the touch sensitive display 402, the electronic device 400 (e.g., the processor 401) may perform text entry according to the second gesture.

Figure 10A:
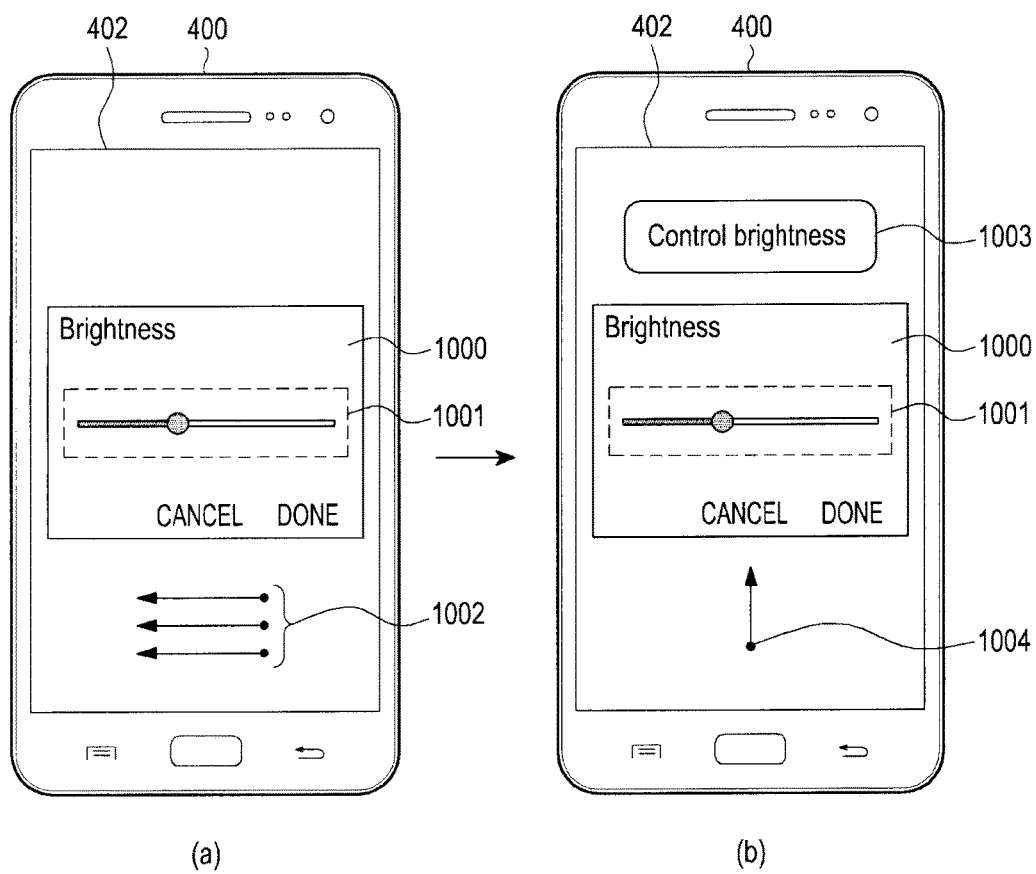
FIG. 10A and FIG. 10B are views illustrating examples of screen brightness adjusting functions as per gestures on an electronic device according to embodiments of the present disclosure.
Figure 10B:
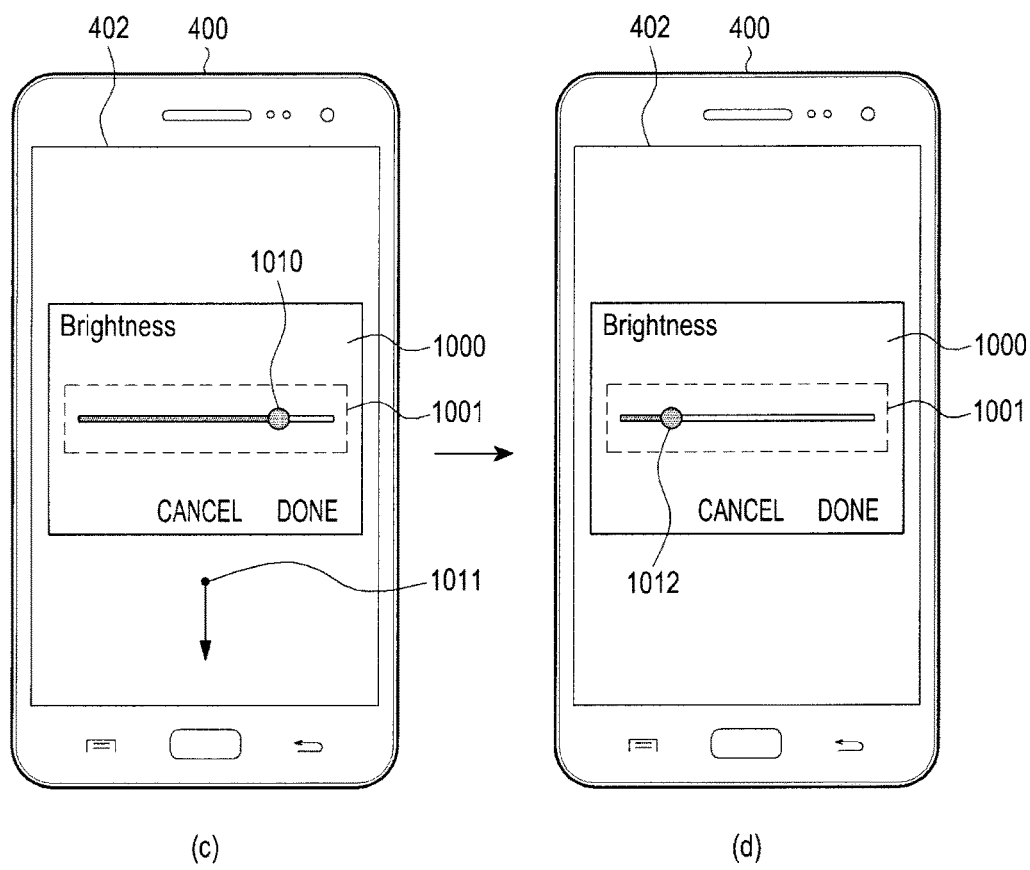

FIGS. 10a and 10b are views illustrating examples of screen brightness adjusting functions as per gestures on an electronic device according to embodiments of the present disclosure.

Referring to FIGS. 10a and 10b, the electronic device 400 (e.g., the processor 401) may display an object 1000 for adjusting screen brightness on the touch sensitive display 402 and select or focus upon at least a part or portion (e.g., a seek bar) 1001 of the object 1000, according or in response to an input selecting or focusing upon the at least part or portion (e.g., a seek bar) 1001 of the object 1000.

When a first gesture (e.g., a three-finger touch and drag left) 1002 is detected onto the touch sensitive display 402 as shown in FIG. 10a(a), the electronic device 400 (e.g., the processor 401) may determine and invoke a first function (e.g., a brightness control function) corresponding to the object 1000 and the first gesture 1002 and may display, on the touch sensitive display 402, a menu (or image) 1003 for indicating the invoked first function, as shown in FIG. 10a(b).

When a second gesture (e.g. a single-finger touch and drag up) 1004 is inputted onto the touch sensitive display 402, the electronic device 400 (e.g., the processor 401) may control the first function according to the second gesture 1004. The electronic device 400 (e.g., the processor 401) may adjust (1010) the selected (or focused) seek bar as shown in FIG. 10b (c), setting (or varying) for the screen a greater brightness. For example, the electronic device 400 (e.g., the processor 401) may vary the set brightness value by adjusting (1010) the seek bar and/or output a voice cue confirming the same (e.g., stating, "brightness 80%") to notify a user of the altered brightness value, while setting (or varying) the actual screen brightness according to the varied set brightness value.

When a second gesture (e.g. a single-finger touch and drag down) 1011 is inputted onto the touch sensitive display 402, the electronic device 400 (e.g., the processor 401) may adjust (1012) the seek bar as shown in FIG. 10b (d), setting (or varying) for the screen a darker brightness value. For example, the electronic device 400 (e.g., the processor 401) may vary the set brightness value by adjusting (1012) the seek bar and output a voice (e.g., state, "brightness 20%") to notify a user of the altered brightness value while setting (or varying) the screen brightness according to the varied set brightness value.

Figure 11A:
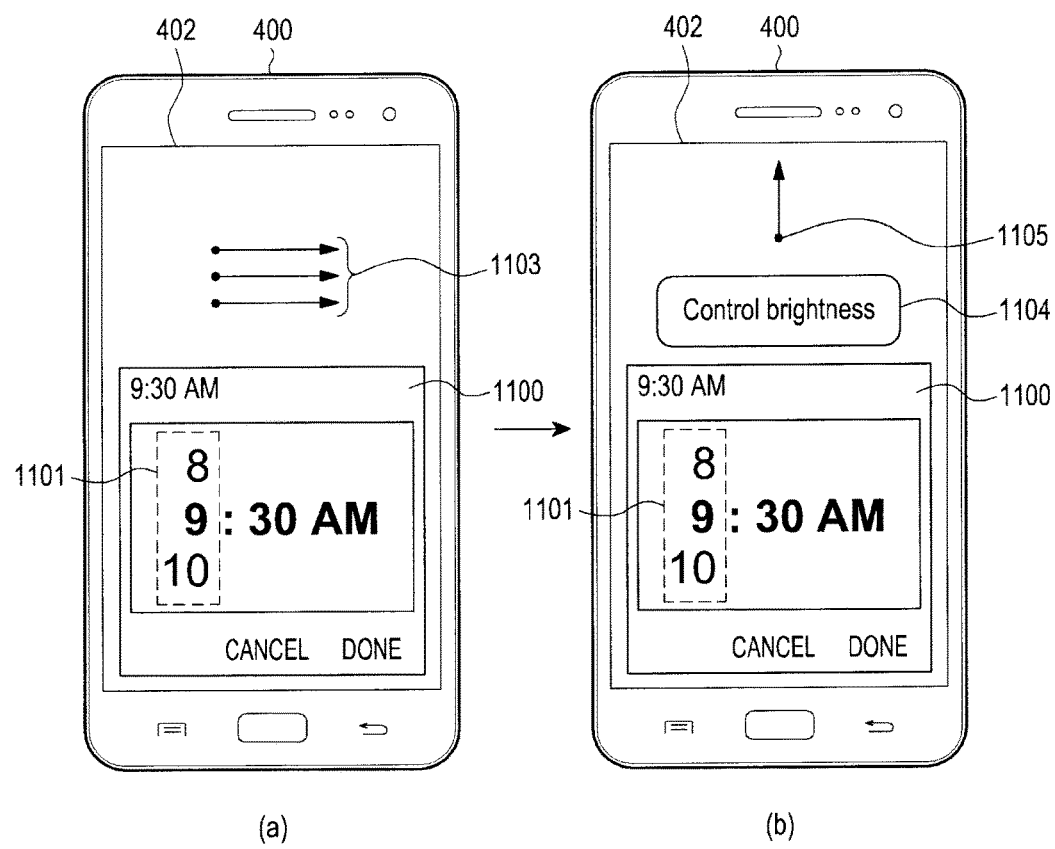
FIG. 11A and FIG. 11B are views illustrating examples of time adjusting functions as per gestures on an electronic device according to embodiments of the present disclosure.
Figure 11B:
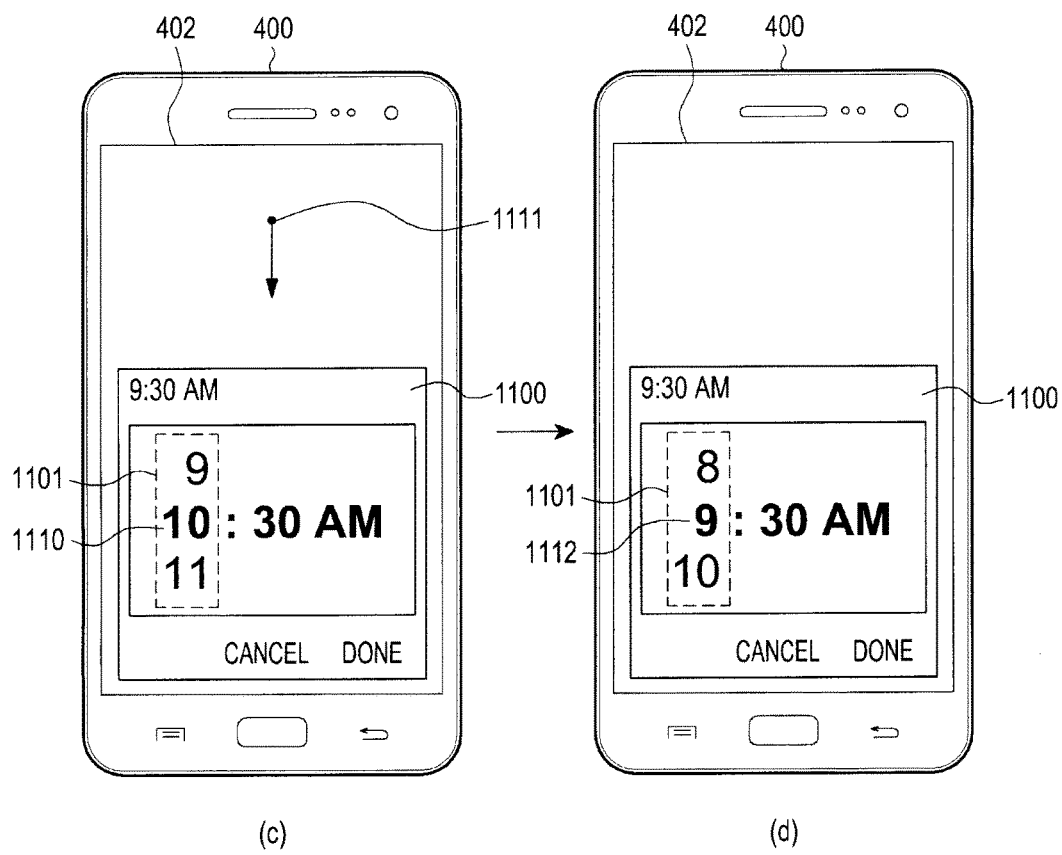

FIGS. 11a, 11b, and 11c are views illustrating examples of time adjusting functions as per gestures on an electronic device according to embodiments of the present disclosure.

Referring to FIGS. 11a, 11b, and 11c, the electronic device 400 (e.g., the processor 401) may display an object 1100 for setting a time on the touch sensitive display 402 and select (or focus) (1101) at least part (e.g., a set-time area or a set-hour area) of the object 1100 according to an input for selecting or focusing the at least part (e.g., a set-time area) of the object 1100.

When a first gesture (e.g., a three-finger touch and drag right) 1103 is detected on the touch sensitive display 402 as shown in FIG. 11a (a), the electronic device 400 (e.g., the processor 401) may determine and invoke a first function (e.g., time setting control or time selector control) corresponding to the object 1100 and the first gesture 1103 and may display, on the touch sensitive display 402, a menu (or image) 1104 for indicating the invoked first function as shown in FIG. 11a (b).

When a second gesture (e.g. a single swipe up, or a single-finger touch and drag up) 1105 is inputted onto the touch sensitive display 402, the electronic device 400 (e.g., the processor 401) may control the first function according to the second gesture 1105. The electronic device 400 (e.g., the processor 401) may adjust the selected or focused set-time area (e.g., a set-hour area) 1101 as shown in FIG. 11b (c), setting the time to "10 o'clock" (or varying the time from "9 o'clock" to "10 o'clock"). For example, the electronic device 400 (e.g., the processor 401) may vary the set brightness value by adjusting (1010) the seek bar and output a voice (e.g., "brightness 80%") to notify a user of the altered brightness value while setting (or varying) the screen brightness according to the varied set brightness value.

When the second gesture (e.g., a single-finger swipe down, or a single-finger touch and drag down) 1111 is inputted onto the touch sensitive display, the electronic device 400 (e.g., the processor 401) may adjust the selected (or focused) time setting area 1101 as shown in FIG. 11b(d), changing the time from "10 o'clock" to "9 o'clock." (1112). For example, the electronic device 400 (e.g., the processor 401) may vary the time setting value by adjusting the time setting area, set the hour to "10 o'clock" (or change the hour from "9 o'clock" to "10 o'clock") (1112), and output a voice (e.g., "10 o'clock") for notifying a user of the altered time setting value.

Figure 12A:
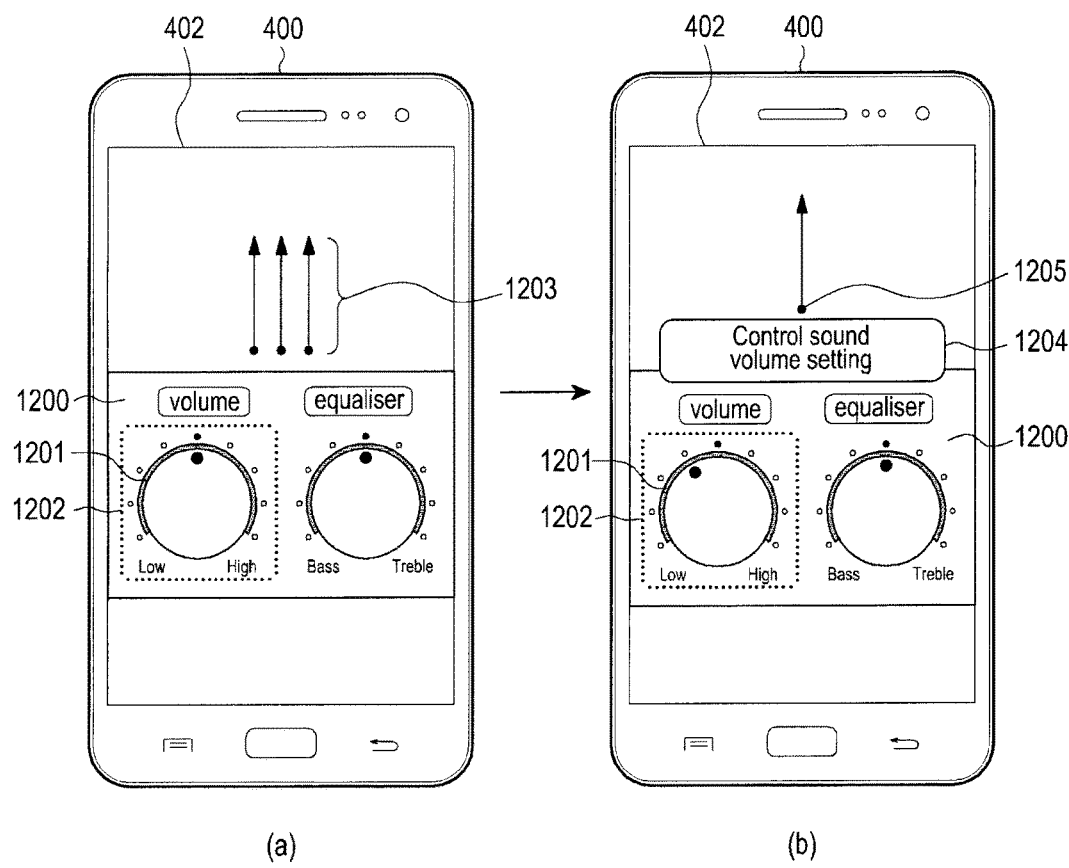
FIG. 12A and FIG. 12B are views illustrating examples of sound volume adjusting functions as per gestures on an electronic device according to embodiments of the present disclosure.
Figure 12B:
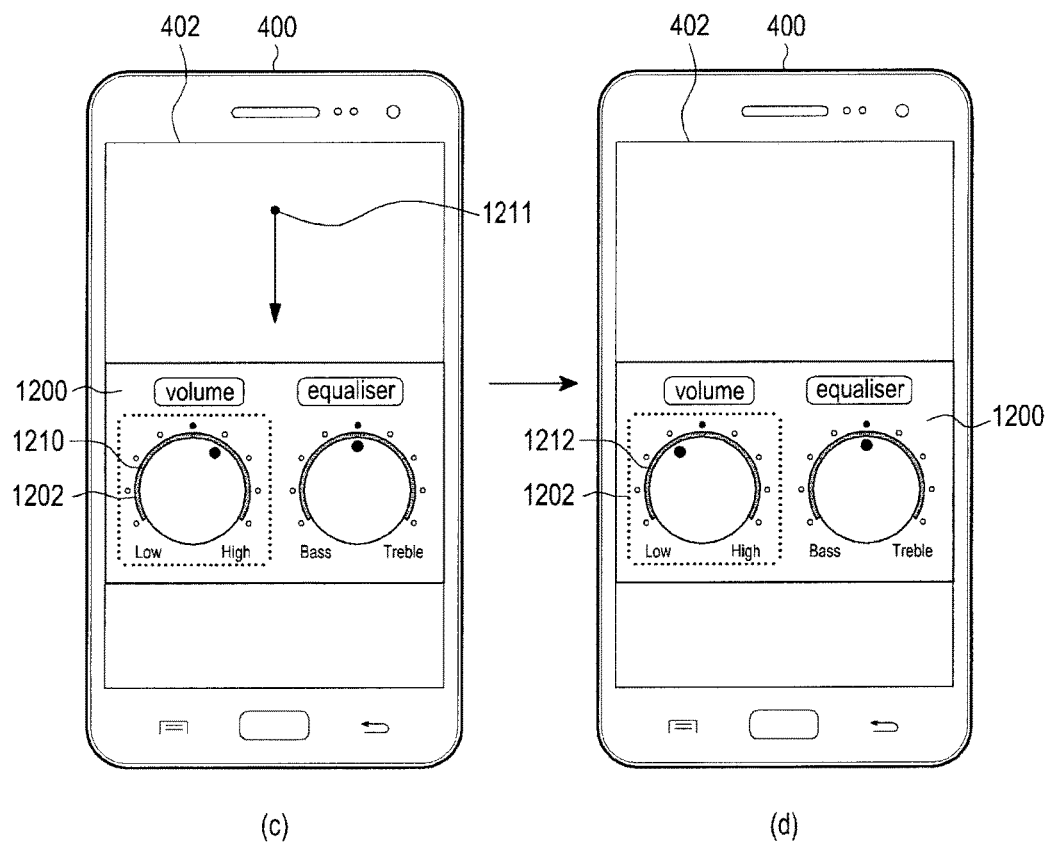

FIGS. 12a and 12b are views illustrating examples of sound volume adjusting functions as per gestures on an electronic device according to embodiments of the present disclosure.

Referring to FIGS. 12a and 12b, the electronic device 400 (e.g., the processor 401) may display an object 1200 for adjusting sound volume on the touch sensitive display 402 and select or focus (1202) at least part (e.g., a first circular dial) 1201 of the object 1200 according to an input for selecting or focusing the at least part (e.g., a first circular dial) 1201 of the object 1200.

When a first gesture (e.g., a three-finger swipe up, or a three-finger touch and drag up) 1203 is detected onto the touch sensitive display 402 as shown in FIG. 12a (a), the electronic device 400 (e.g., the processor 401) may determine and invoke a first function (e.g., a sound volume setting control function or volume control function) corresponding to the object 1200 and the first gesture 1203 and may display, on the touch sensitive display 402, a menu (or image) 1204 for indicating the invoked first function as shown in FIG. 12a(b).

When a second gesture (e.g. a single-finger swipe up, or a single-finger touch and drag up) 1205 is inputted onto the touch sensitive display 402, the electronic device 400 (e.g., the processor 401) may control the first function according to the second gesture 1205. The electronic device 400 (e.g., the processor 401) may adjust (1210) the selected or focused first circular dial as shown in FIG. 12b(c), setting (or varying) the sound volume to rise. For example, the electronic device 400 (e.g., the processor 401) may vary the set sound volume value by adjusting (1210) the first circular dial and output a voice (e.g., "sound volume 60%") to notify a user of the altered set sound volume value while setting (or varying) the sound volume according to the varied set sound volume value.

When a second gesture (e.g. a single-finger swipe down, or a single-finger touch and drag down) 1211 is inputted onto the touch sensitive display 402, the electronic device 400 (e.g., the processor 401) may adjust (1212) the first circular dial as shown in FIG. 12b (d), setting (or varying) the sound volume to lower. For example, the electronic device 400 (e.g., the processor 401) may vary the set sound volume value by adjusting (1212) the first circular dial and output a voice (e.g., "sound volume 40%") to notify a user of the altered set sound volume value while setting (or varying) the sound volume according to the varied set sound volume value.

According to an embodiment of the present disclosure, a sound (or audio) equalizer may be adjusted in at least similar manner with the above description.

Figure 13A:
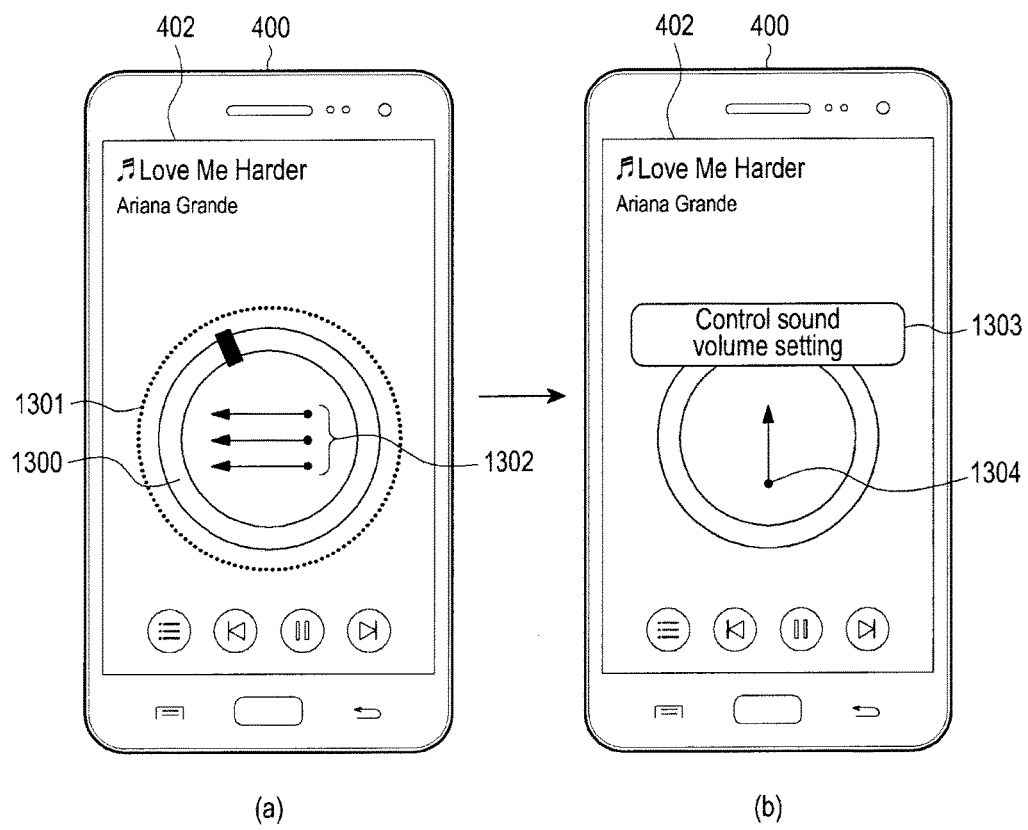
FIG. 13A and FIG. 13B are views illustrating examples of sound volume adjusting functions as per gestures on an electronic device according to embodiments of the present disclosure.
Figure 13B:
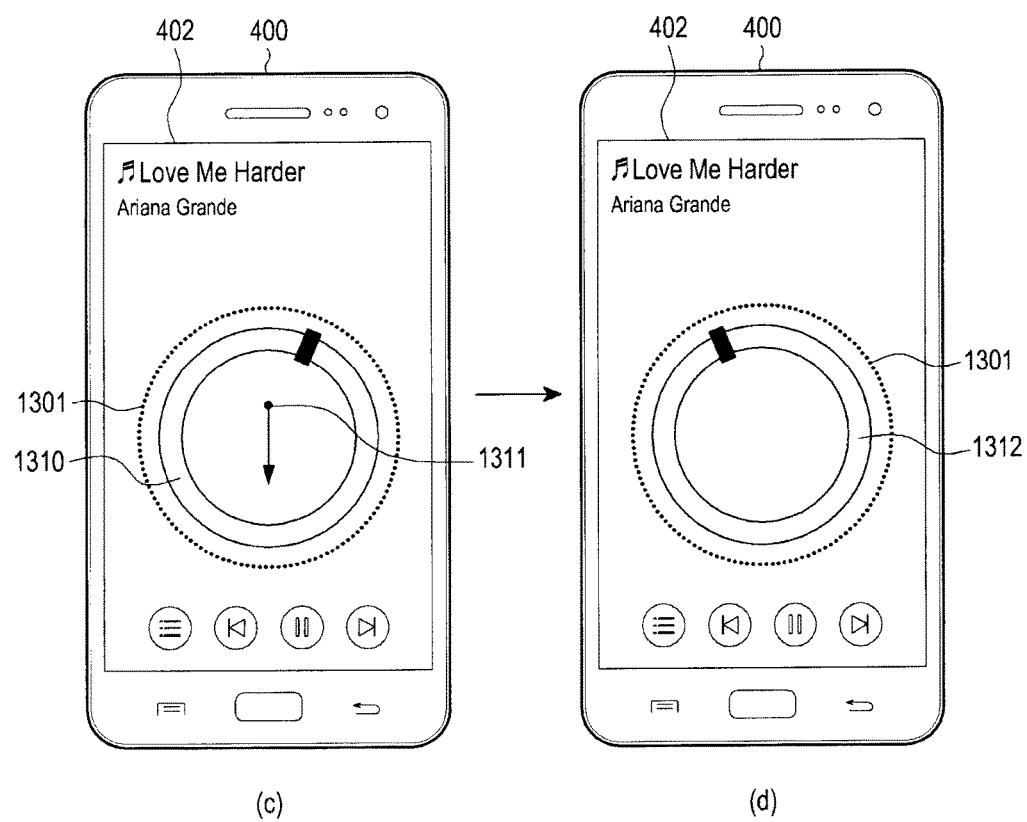

FIGS. 13a and 13b are views illustrating examples of sound volume adjusting functions as per gestures on an electronic device according to embodiments of the present disclosure.

Referring to FIGS. 13a and 13b, the electronic device 400 (e.g., the processor 401) may run a music application as per a request for running the application and display a running screen on the touch sensitive display 402.

According to an input for selecting or focusing at least part (e.g., a second circular dial) 1300 of the running screen displayed, the electronic device 400 (e.g., the processor 401) may select or focus (1301) the part (e.g. a second circular dial) 1300 of the running screen.

When a first gesture (e.g., a three-finger swipe left, or a three-finger touch and drag left) 1302 is detected onto the touch sensitive display 402 as shown in FIG. 13a(a), the electronic device 400 (e.g., the processor 401) may determine and invoke a first function (e.g., a sound volume setting function) corresponding to the first gesture in relation to the running screen and may display, on the touch sensitive display 402, a menu (or image) 1303 for indicating the invoked first function as shown in FIG. 13a(b).

When a second gesture (e.g. a single-finger swipe up, or a single-finger touch and drag up) 1304 is inputted onto the touch sensitive display 402, the electronic device 400 (e.g., the processor 401) may control the first function according to the second gesture 1304. The electronic device 400 (e.g., the processor 401) may adjust (1310) the selected or focused second circular dial as shown in FIG. 13b(c), setting (or varying) the sound volume to rise. For example, the electronic device 400 (e.g., the processor 401) may vary the set sound volume value by adjusting (1310) the second circular dial and output a voice (e.g., "sound volume 60%") to notify a user of the altered set sound volume value while setting (or varying) the sound volume according to the varied set sound volume value.

When a second gesture (e.g. a single-finger swipe down, or a single-finger touch and drag down) 1311 is inputted onto the touch sensitive display 402, the electronic device 400 (e.g., the processor 401) may adjust (1312) the second circular dial as shown in FIG. 13b (d), setting (or varying) the sound volume to lower. For example, the electronic device 400 (e.g., the processor 401) may vary the set sound volume value by adjusting (1312) the second circular dial and output a voice (e.g., "sound volume 40%") to notify a user of the altered set sound volume value while setting (or varying) the sound volume according to the varied set sound volume value.

Figure 14A:
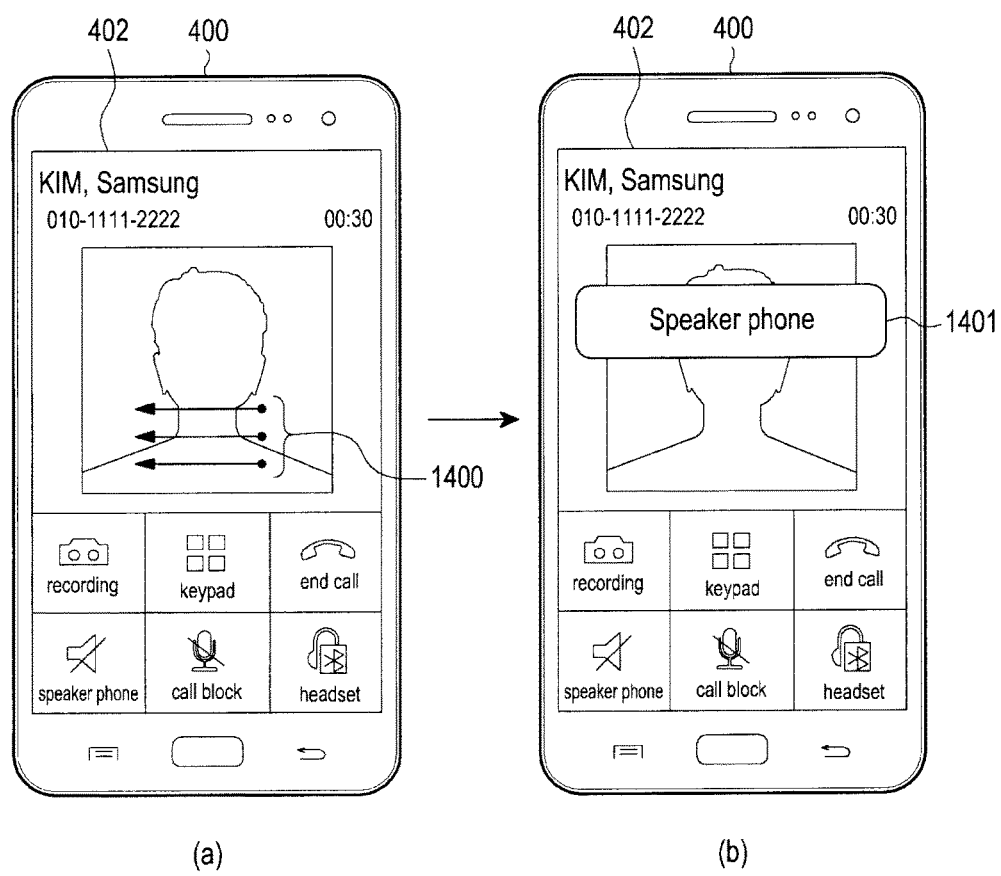
FIG. 14A and FIG. 14B are views illustrating examples of call functions as per gestures on an electronic device according to embodiments of the present disclosure.
Figure 14B:
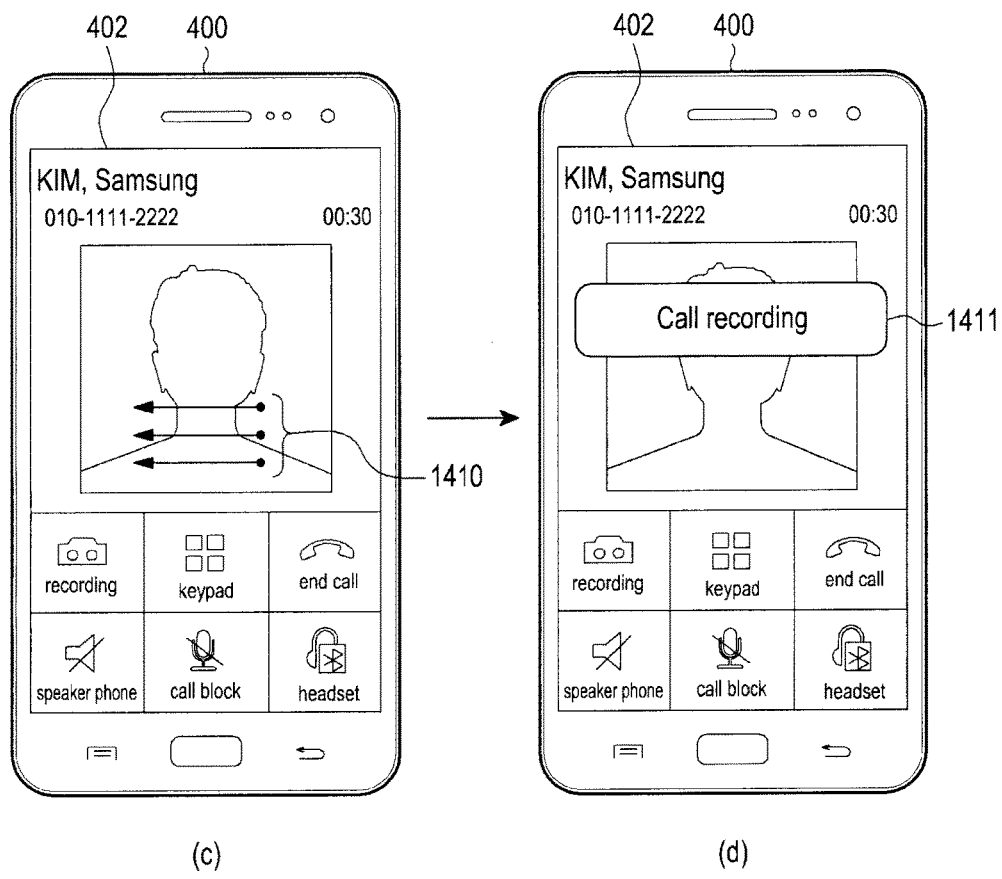

FIGS. 14a and 14b are views illustrating examples of call functions as per gestures on an electronic device according to embodiments of the present disclosure.

Referring to FIGS. 14a and 14b, the electronic device 400 (e.g., the processor 401) may run a call application for a phone talk according to the reception or dispatch of a call and display a running screen of the call application on the touch sensitive display 402.

When a first gesture (e.g., a three-finger touch and drag left) 1400 is detected onto the touch sensitive display 402 as shown in FIG. 14a(a), the electronic device 400 (e.g., the processor 401) may determine a first function corresponding to the running call application (or running screen) and invoke a call control function (e.g., a call recording function, keypad display function, call terminating function, speaker phone function, call sound blocking function, or headset function) corresponding to the determined first function. For example, where the invoked call control function is a "speaker phone function," the electronic device 400 (e.g., the processor 401) may display, on the touch sensitive display 402, a menu (or image) 1401 indicating the invoked speaker phone function as shown in FIG. 14a (b). When the second gesture (e.g., a single-finger swipe or a single-finger touch and drag) (not shown) is inputted onto the touch sensitive display 402, the processor 401 may perform the speaker phone function as per the inputted second gesture.

When a first gesture (e.g., a three-finger swipe left, or a three-finger touch and drag left) 1410 is detected onto the touch sensitive display 402 as shown in FIG. 14b(c), the electronic device 400 (e.g., the processor 401) may determine a first function corresponding to the running call application (or running screen) and invoke a call recording function corresponding to the determined first function. Or, where the speaker phone function, call recording function, and keypad display function are set in the order thereof, the electronic device 400 (e.g., the processor 401) may invoke the speaker phone function as per the input of the first gesture, and when a gesture (e.g., a three-finger touch and drag left or right or a single-finger touch and drag left or right) is inputted to invoke a function that comes next in order to the speaker phone function, the electronic device 400 (e.g., the processor 401) may invoke the call recording function which comes next in order to the speaker phone function.

The electronic device 400 (e.g., the processor 401) may display, on the touch sensitive display 402, a menu (or image) 1411 indicating the invoked call recording function as shown in FIG. 14b (d). According to an embodiment of the present disclosure, the electronic device 400 (e.g., the processor 401) may output a voice (e.g., the call recording function) for notifying a user of the invoked call recording function while displaying the menu (or image) 1411 on the touch sensitive display 402.

FIGS. 15a, 15b, 15c, and 15d are views illustrating examples of methods for displaying menus for multiple functions by an electronic device according to embodiments of the present disclosure.

Figure 15A:
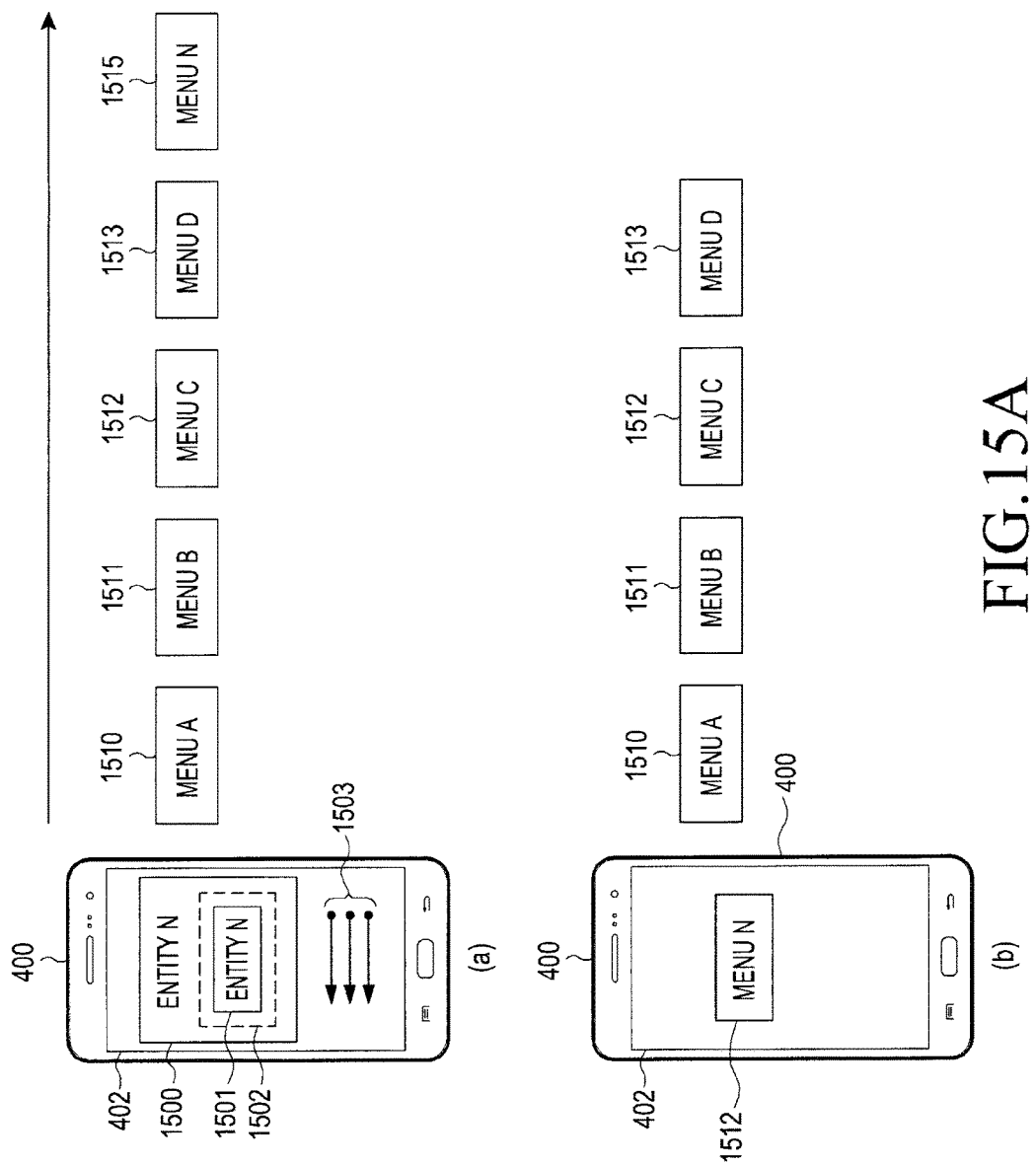
FIG. 15A, FIG. 15B, FIG. 15C, and FIG. 15D are views illustrating examples of methods for displaying menus for multiple functions by an electronic device according to embodiments of the present disclosure.

Referring to FIG. 15a, the electronic device 400 (e.g., the processor 401) may select or focus upon (1502) entity N 1501, which is at least part of object N 1500 displayed on the touch sensitive display 402 as shown in FIG. 15a (a), and detect the input of a first gesture 1503 onto the touch sensitive display 402. For example, the menus for a plurality of functions that may be invoked as per the input of the first gesture (e.g., a three-finger swipe left, or a three-finger touch and drag left) 1503 may include menu A 1510 for function A, menu B 1511 for function B, menu C 1512 for function C, menu D 1513 for function D, and menu N 1515 for function N which may be set in the order of menu A 1510, menu B 1511, menu C 1512, menu D 1513, (menu E of FIG. 15D) and menu N 1515.

The electronic device 400 (e.g., the processor 401) may determine and invoke function N related to object N 1500 among the plurality of functions and display, on the touch sensitive display 402, menu N 1515 for function N as shown in FIG. 15a (b). According to an embodiment of the present disclosure, the plurality of functions are invoked according to a preset order. When the first gesture 1503 is inputted with entity N 1501 of displayed object N 1500 selected (1502), however, function N corresponding to the first gesture 1503 and object N 1500 may be invoked regardless of the preset order.

Figure 15B:
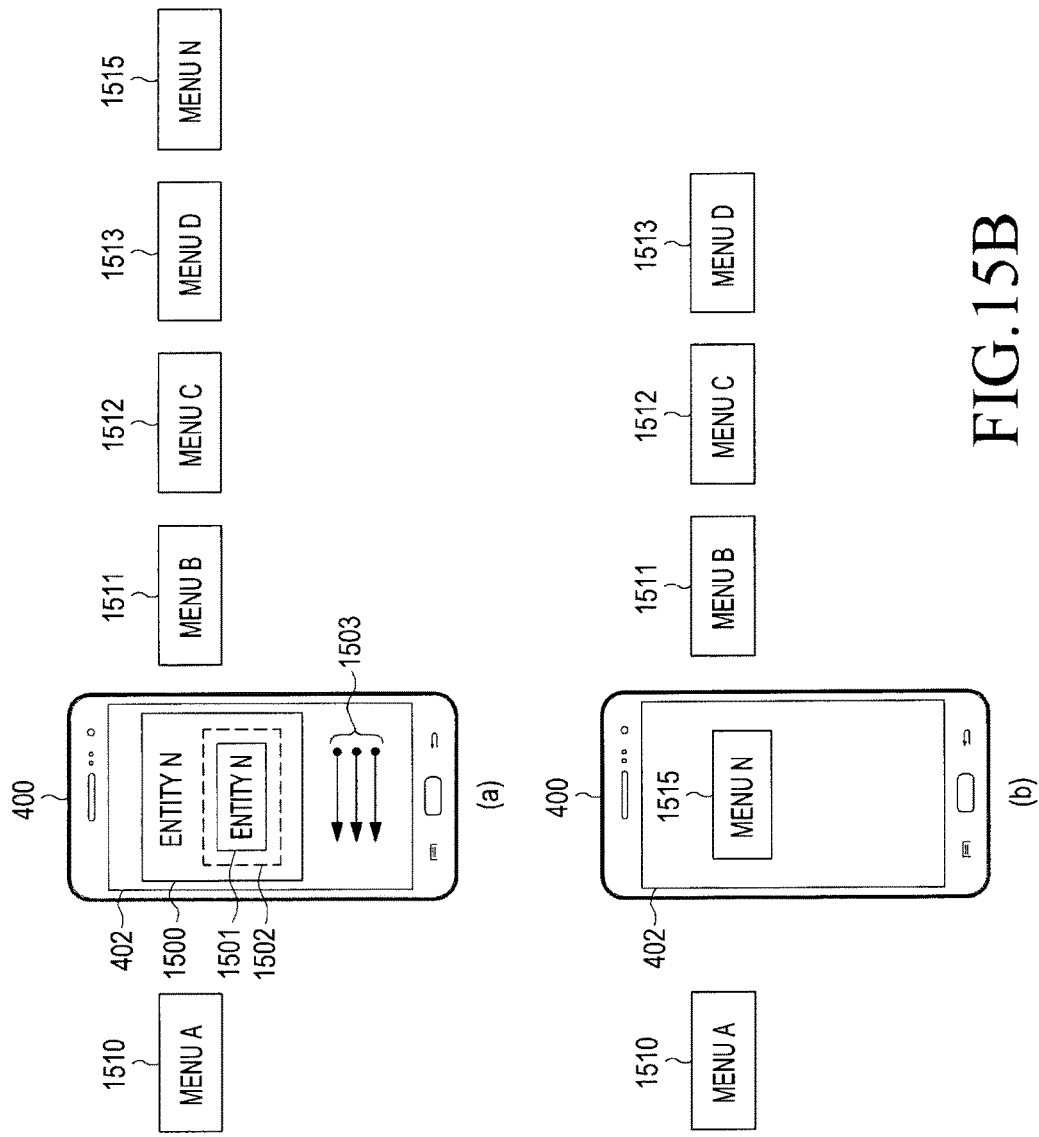

Referring to FIG. 15b, the electronic device 400 (e.g., the processor 401) may select or focus (1502) entity N 1501, which is at least part of object N 1500 displayed on the touch sensitive display 402 as shown in FIG. 15b (a) and detect the input of a first gesture 1503 onto the touch sensitive display 402.

The electronic device 400 (e.g., the processor 401) may determine and invoke function N related to object N 1500 among the plurality of functions and display, on the touch sensitive display 402, menu N 1515 for function N as shown in FIG. 15b (b). According to an embodiment of the present disclosure, function B is supposed to be invoked according to a preset order. When the first gesture 1503 is inputted with entity N 1501 of displayed object N 1500 selected (1502), however, function N corresponding to the first gesture 1503 and object N 1500 may be invoked regardless of the preset order.

Figure 15C:
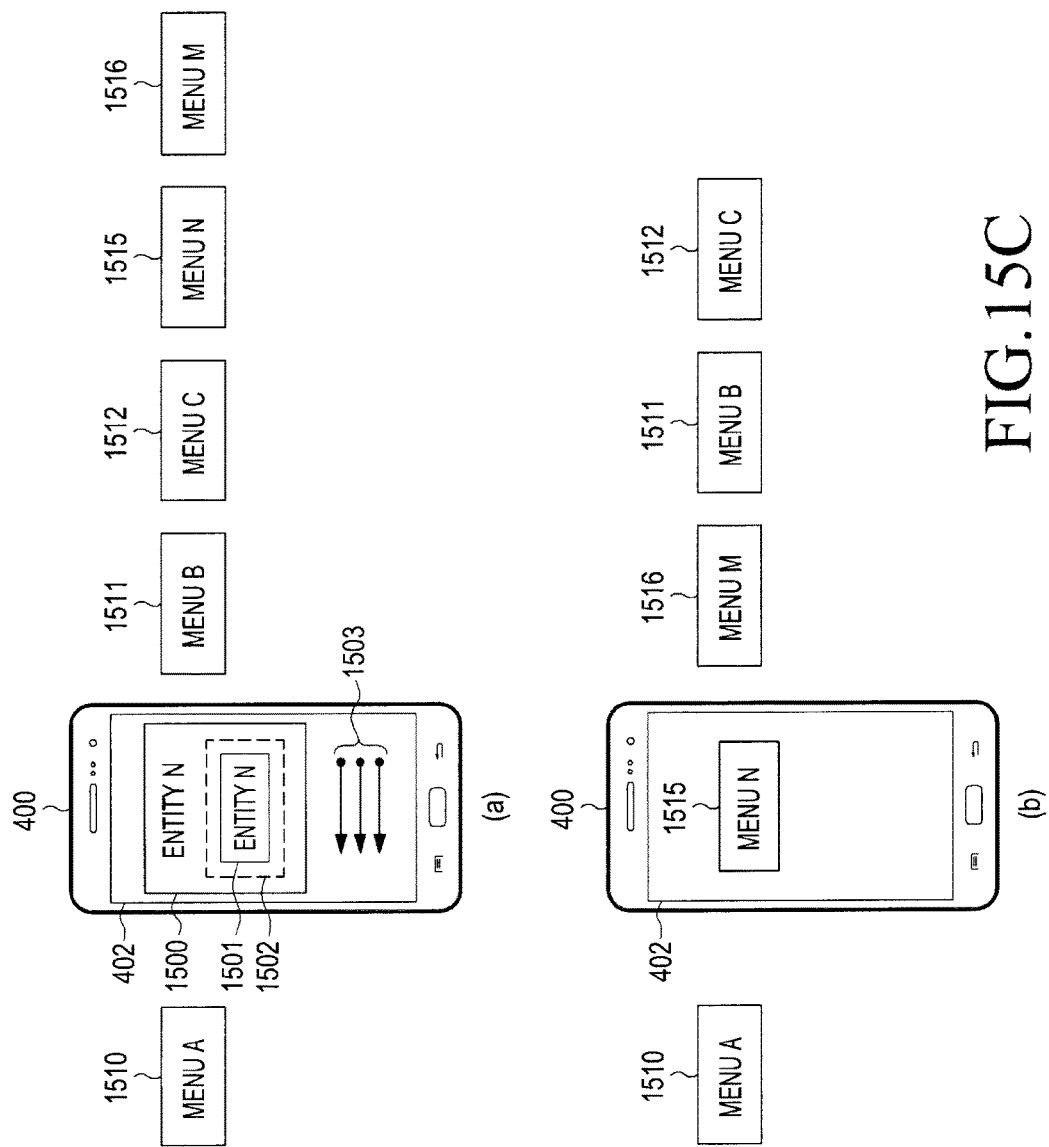

Referring to FIG. 15c, the electronic device 400 (e.g., the processor 401) may select or focus upon (1502) entity N 1501, which is at least part of object N 1500 displayed on the touch sensitive display 402 as shown in FIG. 15c (a) and detect the input of a first gesture 1503 onto the touch sensitive display 402.

The electronic device 400 (e.g., the processor 401) may determine function N and function M related to object N 1500 among the plurality of functions, invoke any one of function N and function M, and display, on the touch sensitive display 402, a menu for any one of function N and function M. For example, the electronic device 400 (e.g., the processor 401) may display, on the touch sensitive display 402, menu N 1515 for function N as shown in FIG. 15c (b). In such case, the functions may be set in the predetermined order of function N, function M, function B, function C, and function A.

When a gesture for invoking a function next to function N is inputted onto the touch sensitive display 402, the electronic device 400 (e.g., the processor 401) may invoke function M which comes next in order to function N and display menu M 1516 for function M on the touch sensitive display 402.

According to an embodiment of the present disclosure, the electronic device 400 (e.g., the processor 401) may determine a user preference to determine any one of function N and function M as per the first gesture. For example, the electronic device 400 (e.g., the processor 401) may determine the user preference for function N and the user preference for function M and first invoke the function with the higher user preference.

Figure 15D:
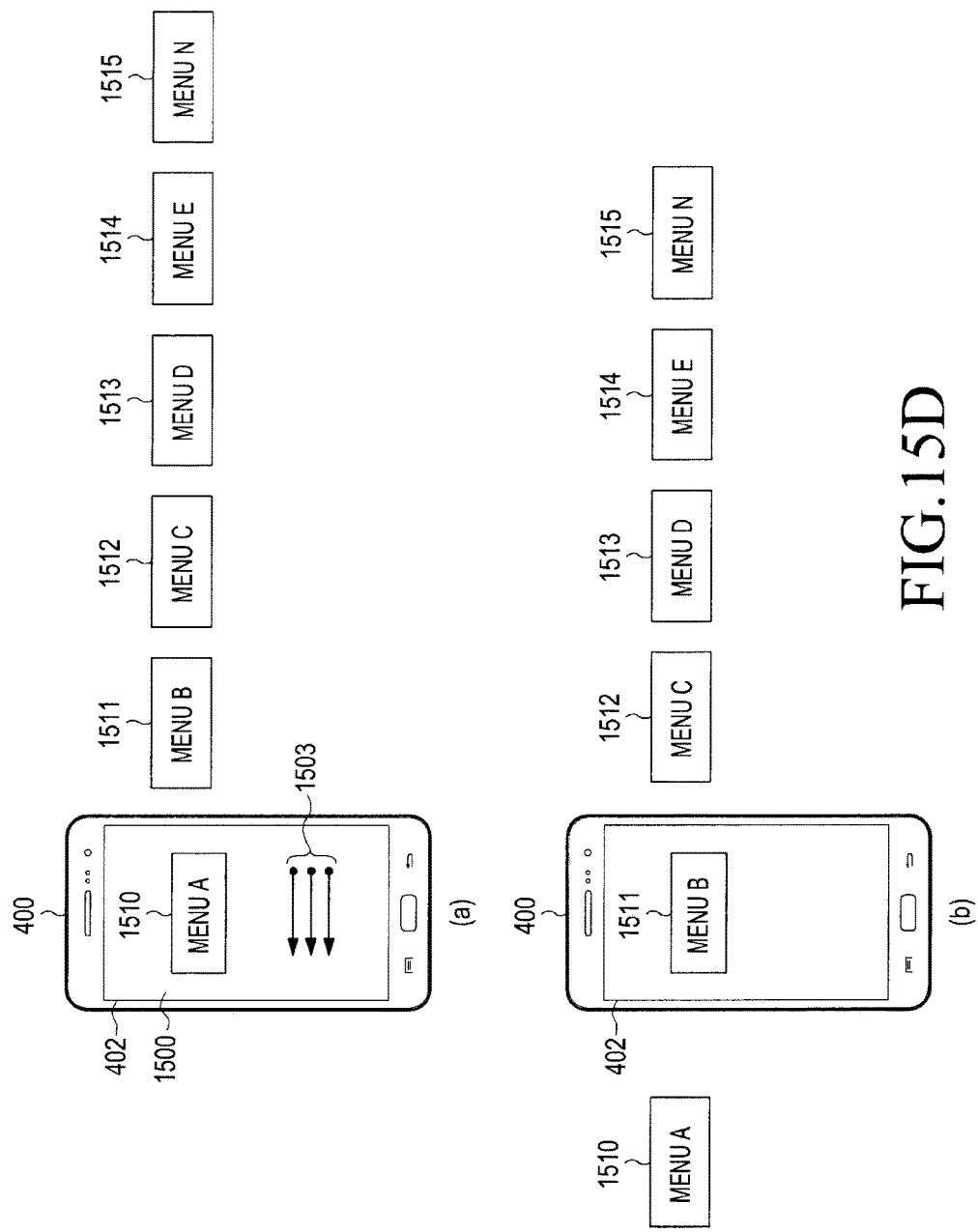

Referring to FIG. 15d, the electronic device 400 (e.g., the processor 401) may invoke function A as per the input of a gesture for invoking the plurality of functions as shown in FIG. 15d(a) and display menu A 1510 for function A invoked on the touch sensitive display 402. When the first gesture 1503 is inputted onto the touch sensitive display 402, the electronic device 400 (e.g., the processor 401) may invoke function B according to an order among the plurality of functions and display, on the touch sensitive display 402, menu B 1511 for function B as shown in FIG. 15*d* (b).

According to an embodiment of the present disclosure, when the first gesture for invoking the plurality of functions is inputted onto the touch sensitive display 402, the electronic device 400 (e.g., the processor 401) may invoke the functions according to a preset or predetermined order (e.g., the order of function A, function B, function C, function D, function E, and function N). In such case, the electronic device 400 (e.g., the processor 401) may invoke function N only by the input of the first gesture, with at least part of the object selected, rather than invoking function N as per a preset order.

Figure 16A:
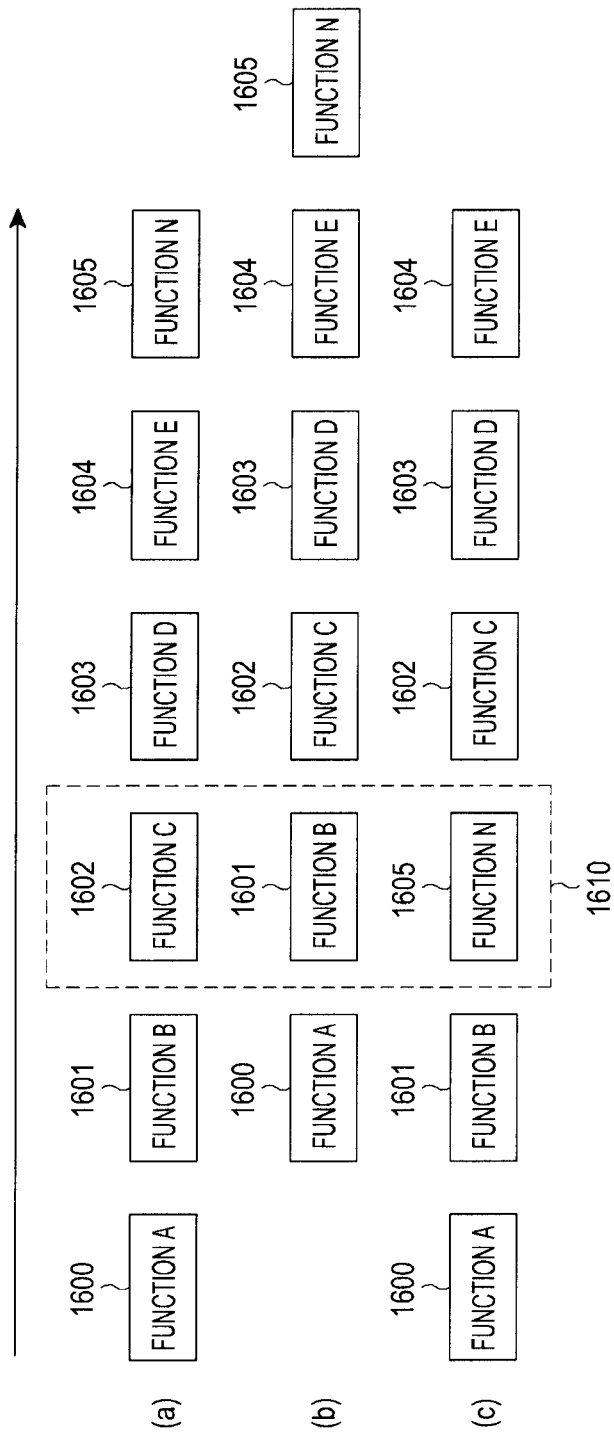
FIG. 16A and FIG. 16B are views illustrating examples of methods for displaying a menu as per an invoked function by an electronic device according to embodiments of the present disclosure.
Figure 16B:
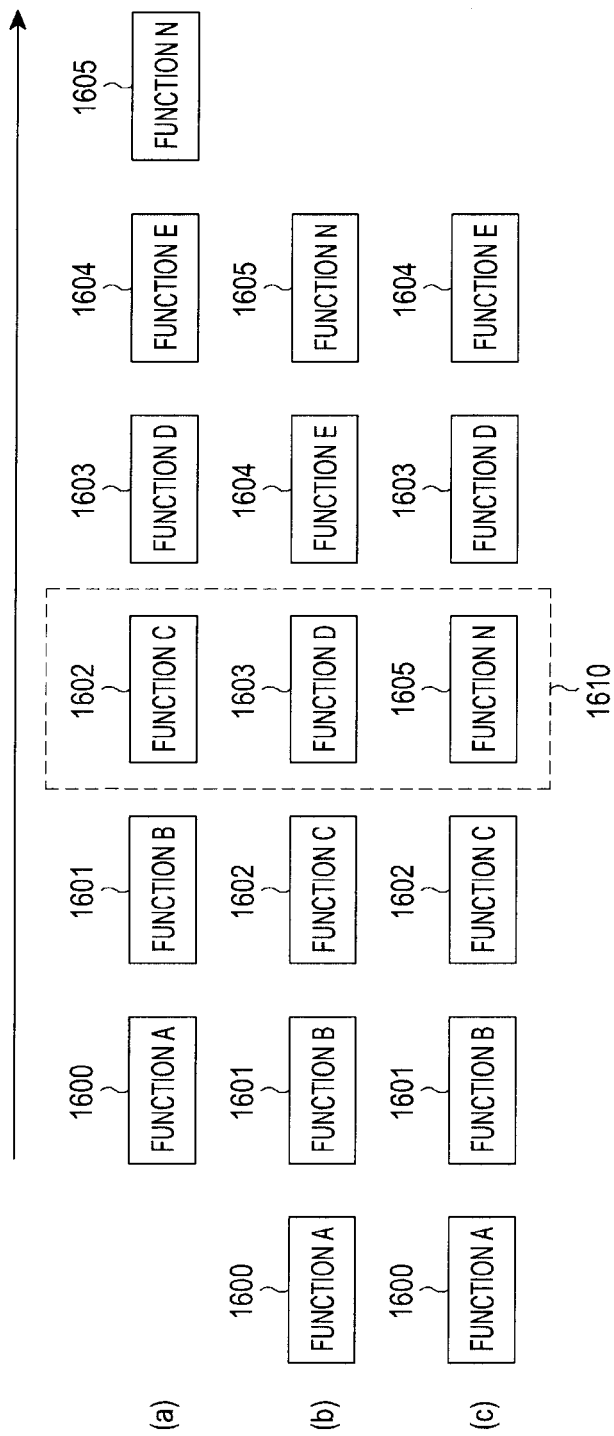

FIGS. 16*a* and 16*b* are views illustrating examples of methods for displaying a menu as per an invoked function by an electronic device according to embodiments of the present disclosure.

Referring to FIG. 16*a*, the plurality of functions may include function A 1600, function B 1601, function C 1602, function D 1603, function E 1604, and function N 1605, as shown in FIG. 16*a* (a) and may be set in the order of function A 1600, function B 1601, function C 1602, function D 1603, function E 1604, and function N 1605.

When a first gesture (e.g., a three-finger touch and drag up or down or left or right) is inputted onto the touch sensitive display 402 to invoke a function that comes before function C 1602 while function C 1602 is invoked (1610) as shown in FIG. 16*a* (a), the electronic device 400 (e.g., the processor 401) may invoke function B 1601 that comes next in order to function C 1602 as shown in FIG. 16*a*(*b*). When at least part (e.g., an entity) of an object displayed on the touch sensitive display 402 is selected or focused, and the first gesture is inputted, the electronic device 400 (e.g., the processor 401) may invoke function N 1605 corresponding to the first gesture and object as shown in FIG. 16*a*(*c*).

Referring to FIG. 16*b*, when a first gesture (e.g., a three-finger touch and drag up or down or left or right) is inputted onto the touch sensitive display 402 to invoke a function that comes next to function C 1602 while function C 1602 is invoked (1610) as shown in FIG. 16*b* (a), the electronic device 400 (e.g., the processor 401) may invoke function D 1603 that comes next in order to function C 1602 as shown in FIG. 16*b*(*b*). When at least part (e.g., an entity) of an object displayed on the touch sensitive display 402 is selected or focused, and the first gesture is inputted, the electronic device 400 (e.g., the processor 401) may invoke function N 1605 corresponding to the first gesture and object as shown in FIG. 16*b*(*c*).

Figure 17A:
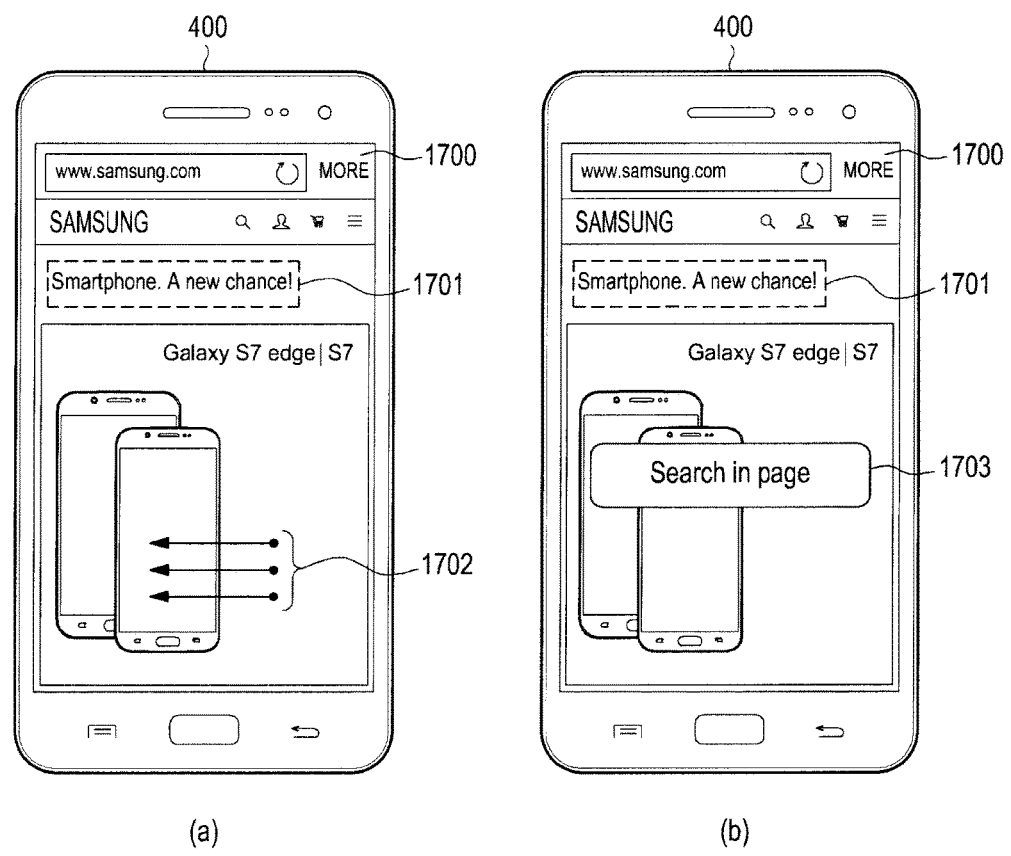
FIG. 17A and FIG. 17B are views illustrating examples of methods for displaying a menu as per an invoked function by an electronic device according to embodiments of the present disclosure.
Figure 17B:
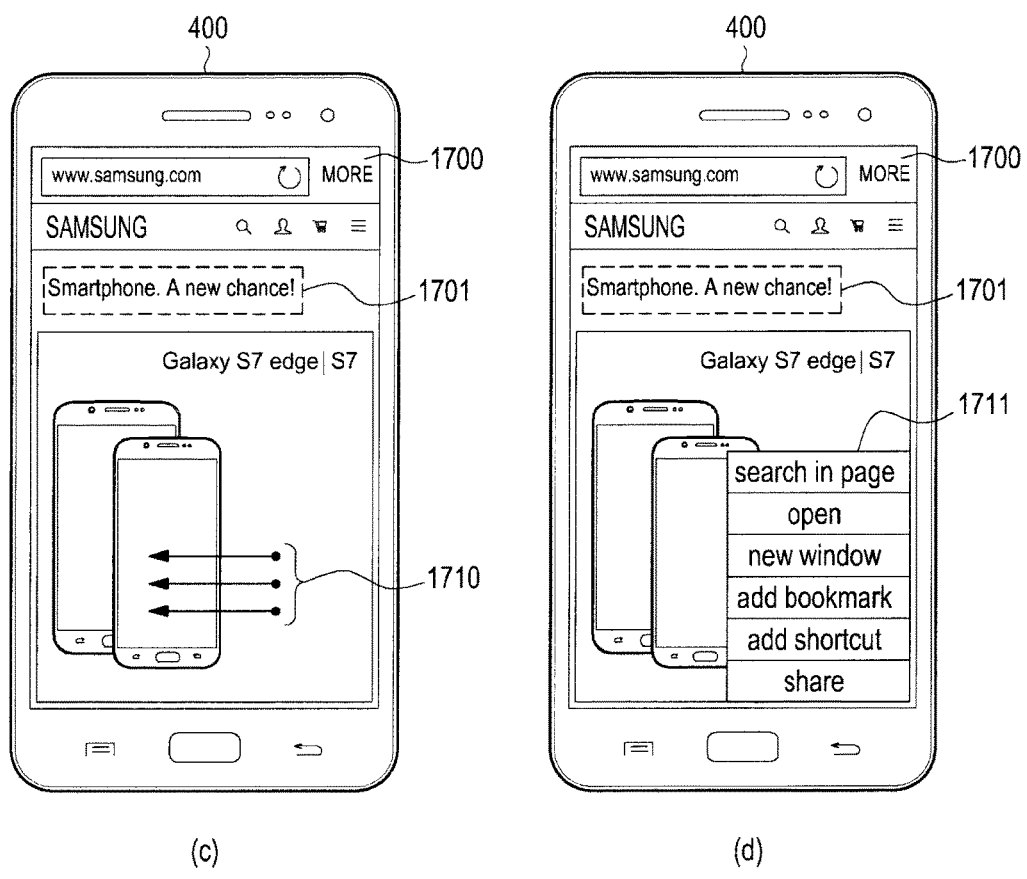

FIGS. 17*a* and 17*b* are views illustrating examples of methods for displaying a menu as per an invoked function by an electronic device according to embodiments of the present disclosure.

Referring to FIG. 17*a*, the electronic device 400 (e.g., the processor 401) may run a web browser and display, on the touch sensitive display 402, a screen 1700 of the running web browser as shown in FIG. 17*a* (a). When at least part 1701 is selected or focused on the web browser screen 1700 displayed on the touch sensitive display 402, and a first gesture (e.g., a three-finger touch and drag left) 1702 is inputted, the electronic device 400 (e.g., the processor 401) may determine that a "search-in-page function" corresponding to the first gesture 1702 and the web browser is the first function as shown in FIG. 17*a*(*b*), invoke the "search-in-page function," and display a menu (or image) 1703 for the invoked "search-in-page function" on the touch sensitive display 402.

Referring to FIG. 17*b*, when at least part 1701 is selected or focused on the web browser screen 1700 displayed on the touch sensitive display 402, and a first gesture (e.g., a three-finger touch and drag left) 1710 is inputted as shown in FIG. 17*b* (c), the electronic device 400 (e.g., the processor 401) may determine the first function corresponding to the first gesture 1710 and the web browser among the plurality of functions.

Where the determined first function is the "search-in-page function," the electronic device 400 (e.g., the processor 401) may display, on the touch sensitive display 402, a menu list 1711 for invoking the plurality of functions related to the web browser as shown in FIG. 17*b*(*d*). The menu list 1711 may be set so that a "search-in-page menu" for invoking the search-in-page function is positioned to come first in order on the menu list 1711.

Figure 18A:
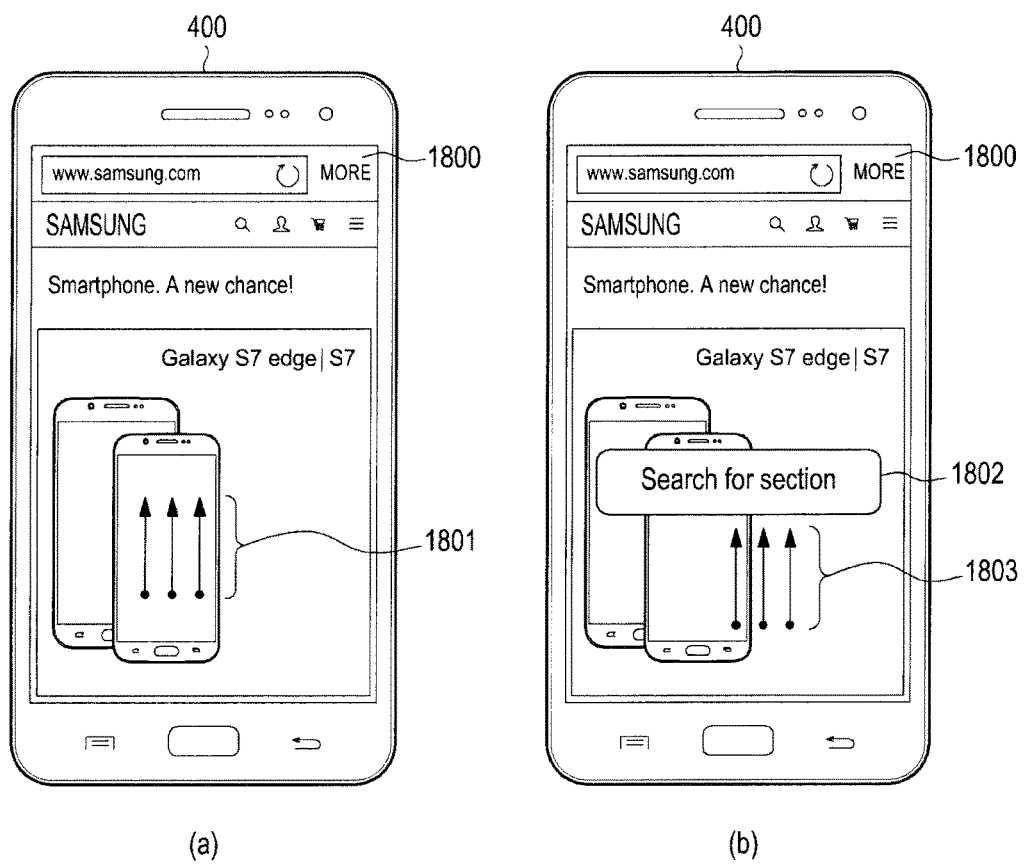
FIG. 18A and FIG. 18B are views illustrating examples of methods for displaying a menu as per an invoked function by an electronic device according to embodiments of the present disclosure.
Figure 18B:
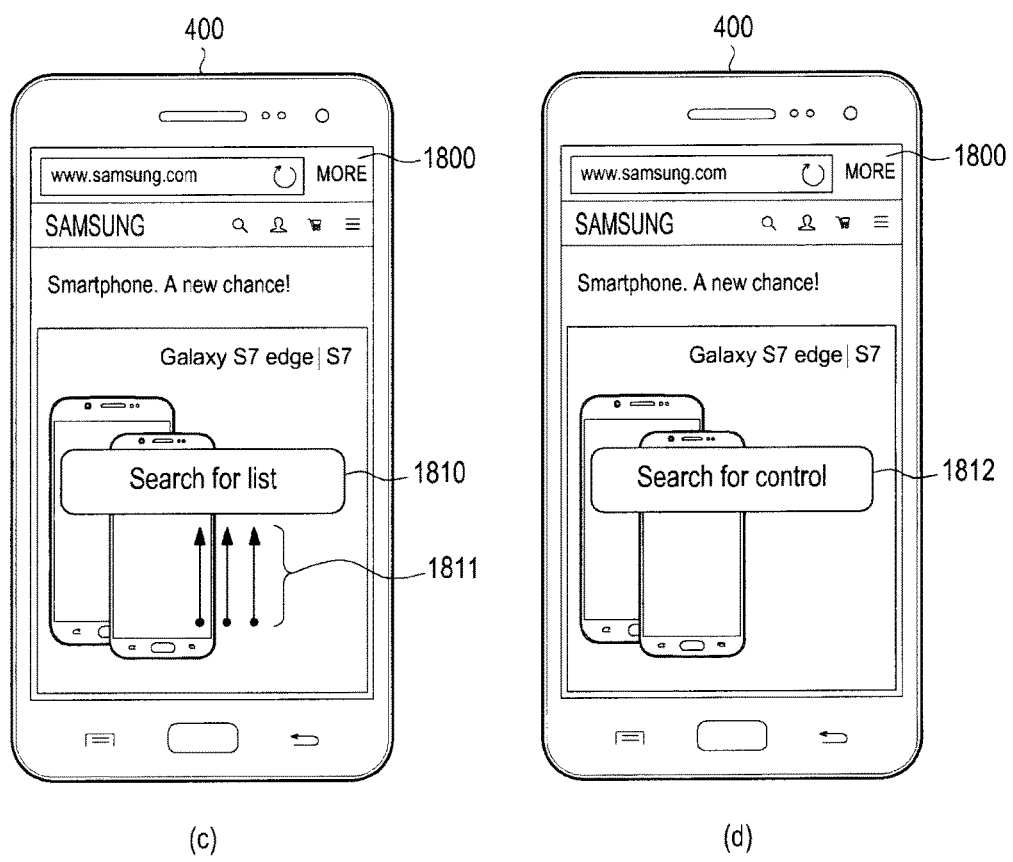

FIGS. 18*a* and 18*b* are views illustrating examples of methods for displaying a menu as per an invoked function by an electronic device according to embodiments of the present disclosure.

Referring to FIG. 18*a*, the electronic device 400 (e.g., the processor 401) may run a web browser to access a particular website and display a screen 1800 of the accessed website on the touch sensitive display 402. For example, upon accessing a search portal website, the electronic device 400 (e.g., the processor 401) may display a screen for accessing the search portal website on the touch sensitive display 402.

When a first gesture (e.g., a three-finger swipe up or a three-finger touch and drag up) 1801 detected by the touch sensitive display 402, the electronic device 400 (e.g., the processor 401) may determine a first function corresponding to the first gesture 1801 and the search portal website and invoke the determined first function. According to an embodiment of the present disclosure, the electronic device 400 (e.g., the processor 401) may determine the attribute of the search portal website or the user preference for the search portal website to determine the first function. For example, the electronic device 400 (e.g., the processor 401) may determine that, among the functions of the web browser, a section search function for searching for the title or link, a list search function for searching for items formatted in a list, and a control search function for searching for a page link, button, and other controls are the first function. The electronic device 400 (e.g., the processor 401) may invoke any one of the section search function, list search function, and control search function that are determined. Where there are a plurality of first functions, such functions (e.g., the section search function, list search function, and control search function) may be invoked as per a preset order, in order of frequency of invocation, or according to an order set by the user.

The electronic device 400 (e.g., the processor 401) may display a menu (or image) 1802 for indicating the invoked first function (e.g., the section search function) on the touch sensitive display 402 as shown in FIG. 18*a* (b).

When a gesture (e.g., a three-finger swipe up or a three-finger touch and drag up) 1803 is detected onto the touch sensitive display 402 to invoke a function that comes next in order to the section search function, the electronic device 400 (e.g., the processor 401) may invoke the list search function which comes next in order to the section search function as shown in FIG. 18*b*(*c*) and display, on the touch sensitive display 402, a menu (or image) 1810 for indicating the invoked list search function.

When a gesture (e.g., a three-finger swipe up or a three-finger touch and drag up) 1811 is inputted onto the touch sensitive display 402 to invoke a function that comes next in order to the list search function, the electronic device 400 (e.g., the processor 401) may invoke the control search function which comes next in order to the list search function as shown in FIG. 18b(d) and display, on the touch sensitive display 402, a menu (or image) 1812 for indicating the invoked control search function. When a gesture for performing the invoked functions is inputted onto the touch sensitive display 402, the electronic device 400 (e.g., the processor 401) may perform the invoked functions (e.g., section search, control search, or list search) according to the inputted gesture.

According to the embodiments of the present disclosure, an electronic device may perform various interactions as per gesture inputs in an easier and more convenient manner.

According to the embodiments of the present disclosure, the user may easily and conveniently recognize gestures for various interactions of the electronic device.

As used herein, the term "module" includes a unit configured in hardware, software, or firmware and may be interchangeably used with other term, e.g., a logic, logic block, part, or circuit. The module may be a single integral part or a minimum unit or part of performing one or more functions. The module may be implemented mechanically or electronically and may include, e.g., an application-specific integrated circuit (ASIC) chip, field-programmable gate arrays (FPGAs), or programmable logic device, that has been known or to be developed in the future as performing some operations. According to an embodiment of the present disclosure, at least a part of the device (e.g., modules or their functions) or method (e.g., operations) may be implemented as instructions stored in a computer-readable storage medium (e.g., the memory 130), e.g., in the form of a program module. The instructions, when executed by a processor (e.g., the processor 120), may enable the processor to carry out a corresponding function. The computer-readable medium may include, e.g., a hard disk, a floppy disc, a magnetic medium (e.g., magnetic tape), an optical recording medium (e.g., CD-ROM, DVD, magnetic-optical medium (e.g., floptical disk), or an embedded memory. The instruction may include a code created by a compiler or a code executable by an interpreter. Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, in parallel, repeatedly or heuristically, or at least some operations may be executed in a different order or omitted or other operations may be added.

As is apparent from the foregoing description, according to the embodiments of the present disclosure, an electronic device may perform various interactions as per gesture inputs in an easier and more convenient manner.

According to the embodiments of the present disclosure, the user may easily and conveniently recognize gestures for various interactions of the electronic device.

What is claimed is:

1. An electronic device, comprising:
   a touch sensitive display;
   a processor electrically coupled with the touch sensitive display; and
   a memory electrically connected with the processor, wherein the memory stores instructions executable by the processor to:
   detect a first gesture input to the touch sensitive display while an object is displayed on the touch sensitive display,
   in response to the first gesture input, identify a first function from among a plurality of functions based on a predetermined order corresponding to each of the plurality of functions, wherein the predetermined order is adjusted at least partially based on information related to the object, and the first function corresponds to a first order from among the adjusted predetermined order, and
   in response to detecting a second gesture input to the touch sensitive display, control the identified first function based at least in part on the second gesture input.

2. The electronic device of claim 1, wherein the instructions are further executable by the processor to:
   select at least part of the object while the object is displayed on the touch sensitive display.

3. The electronic device of claim 1, wherein
   the predetermined order of the plurality of functions is adjusted at least partially based on the information related to the object, the information related to the object including an attribute for the object and a user preference for the object.

4. The electronic device of claim 1, wherein the first function is invoked firstly while the object is executed.

5. The electronic device of claim 1, wherein the instructions are further executable by the processor to:
   generate a notification for notifying the identified first function; and
   display the generated notification on the touch sensitive display.

6. The electronic device of claim 1, wherein the instructions are further executable by the processor to:
   identify an attribute for the object, and
   identify the first function from among the plurality of functions at least partially based on the information related to the object including the identified attribute.

7. The electronic device of claim 6, wherein the instructions are further executable by the processor to:
   store historical information indicating functions corresponding to the object, and
   identify the first function as a preferred function based on the information related to the object including the stored historical information from among the plurality of functions.

8. The electronic device of claim 1, wherein the instructions are further executable by the processor to:
   identify a user preference for the object, and
   identify the first function from among the plurality of functions at least partially based on the information related to the object including the identified user preference.

9. The electronic device of claim 1, wherein the instructions are further executable by the processor to:
   detect an intended operation for the object based on a user selection, and
   identify the first function from among the plurality of functions based on the information related to the object including the detected intended operation.

10. The electronic device of claim 1, further comprising a communication interface, wherein the instructions are further executable by the processor to:

transmit by the communication interface a request for identifying the first function to a server, receive the information related to the object indicating the first function from the server in response to the request, and invoke the first function based on the received information related to the object.

11. A method for operating an electronic device, comprising:

detecting a first gesture input to a touch sensitive display while an object is displayed on the touch sensitive display;

in response to the first gesture input, identifying a first function from among a plurality of functions based on a predetermined order corresponding to each of the plurality of functions, wherein the predetermined order of the plurality of functions is adjusted at least partially based on information related to the object, and the first function corresponds to a first order from among the adjusted predetermined order; and in response to detecting a second gesture input to the touch sensitive display, controlling the identified first function corresponding to the second gesture.

12. The method of claim 11, wherein detecting the first gesture further includes:

selecting at least part of the object while the object is displayed on the touch sensitive display.

13. The method of claim 11, wherein the predetermined order of the plurality of functions is adjusted at least partially based on the information related to the object, the information related to the object including an attribute for the object and a user preference for the object.

14. The method of claim 11, wherein the first function is invoked firstly while the object is executed.

15. The method of claim 11, wherein identifying the first function further comprises:

identifying an attribute for the object; and identifying the first function from among the plurality of functions at least partially based on the identified attribute.

16. The method of claim 11, wherein identified the first function further comprises:

identifying a user preference for the object; and identifying the first function from among the plurality of functions at least partially based on the information related to the object including the identified user preference.

17. The method of claim 16, wherein identifying the first function further comprises:

storing historical information indicating functions corresponding to the object; and identifying the first function as a preferred function based on the information related to the object including the stored historical information from among the plurality of functions.

18. The method of claim 11, wherein identifying the first function further comprises:

detecting an intended operation for the object based on a user selection; and identifying the first function from among the plurality of functions based on the information related to the object including the detected intended operation.

19. The method of claim 11, further comprising:

generating a notification for notifying the identified first function; and displaying the generated notification.

20. The method of claim 11, wherein identified the first function further comprises:

transmitting by a communication interface a request for identifying the first function to a server;

receiving the information related to the object including indicating the first function from the server in response to the request; and invoking the first function based on the received information related to the object.

* * * * *